March 11, 1969  P. GRAHAM  3,431,651
DRAFTING MACHINE
Filed June 28, 1967
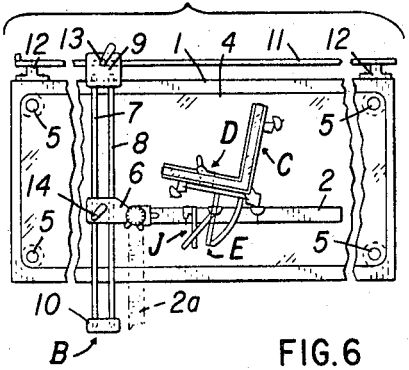
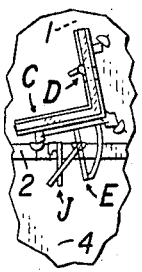
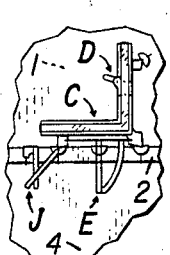
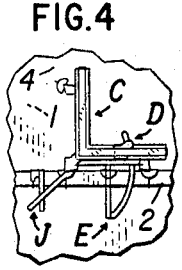
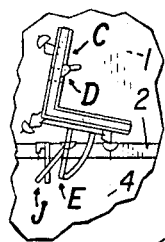
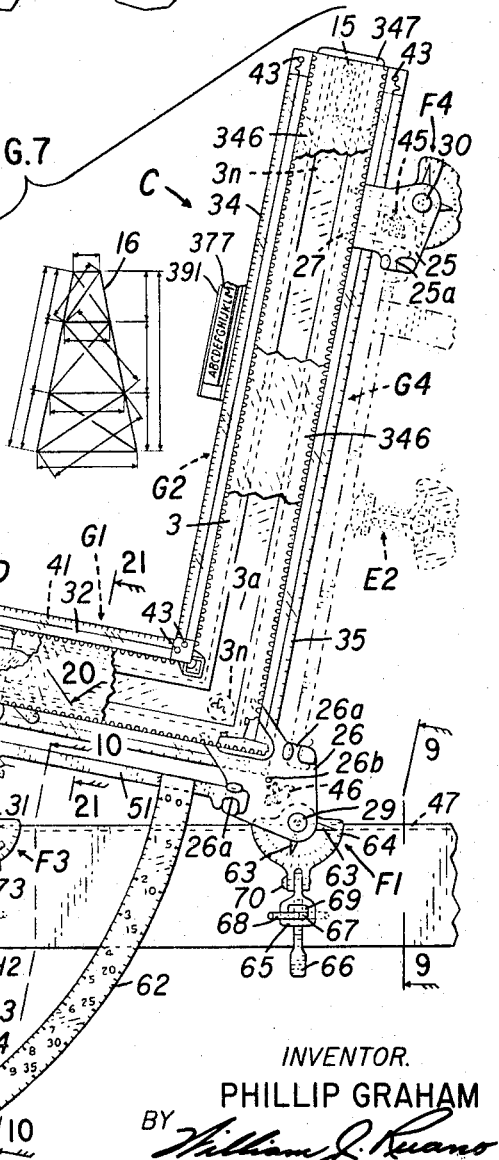
INVENTOR.
PHILLIP GRAHAM

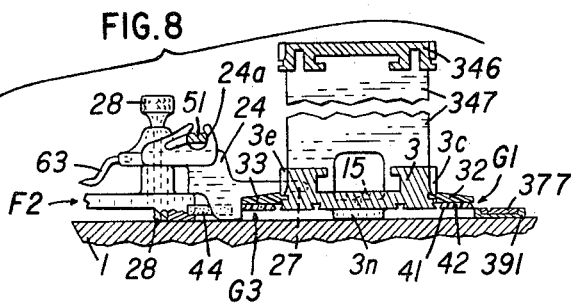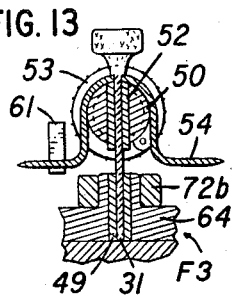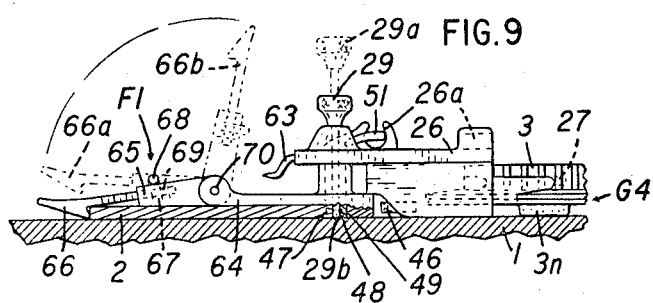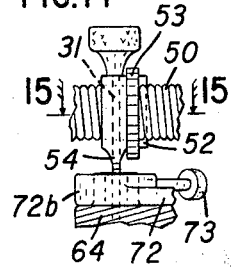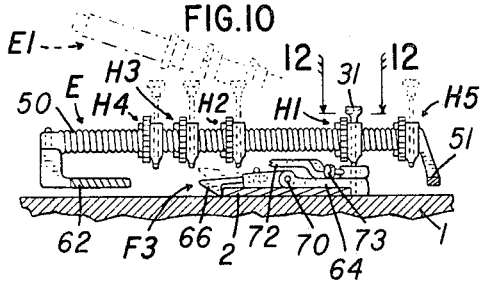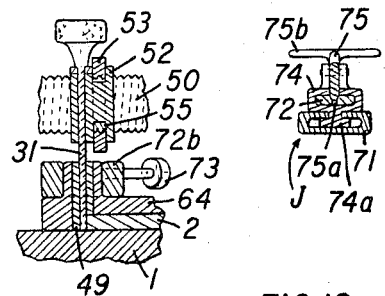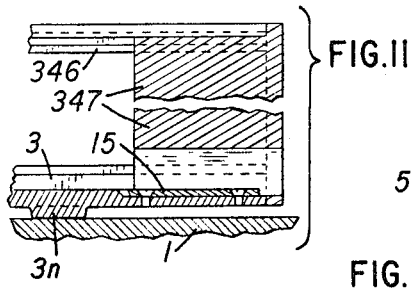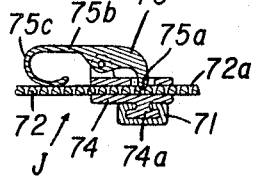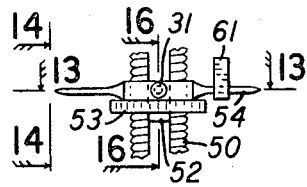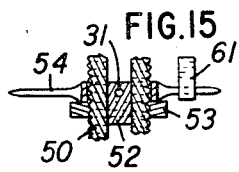

INVENTOR.
PHILLIP GRAHAM
BY
*William J. Ruano*
ATTORNEY

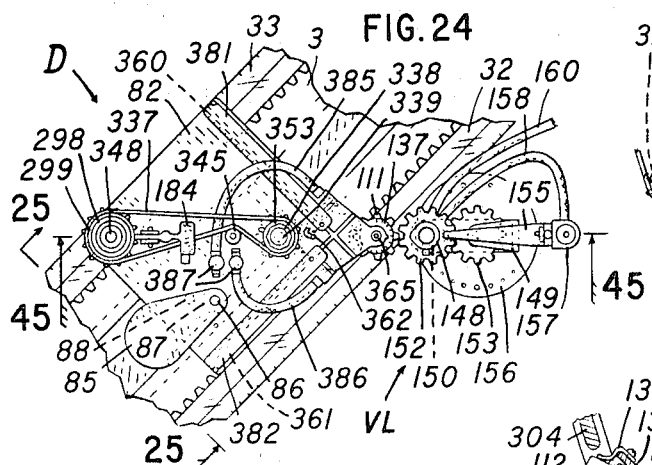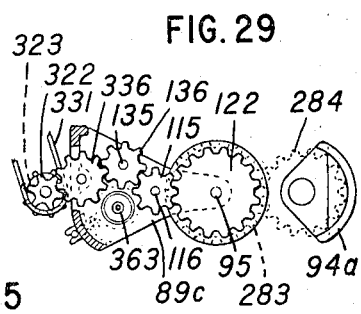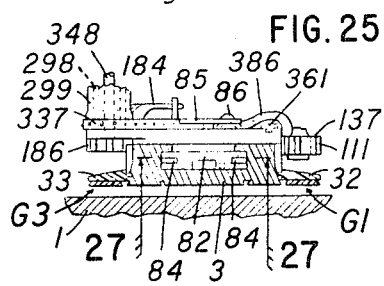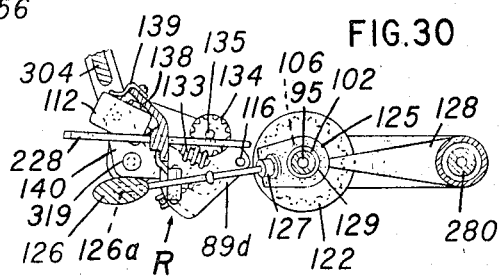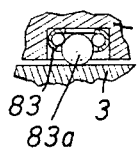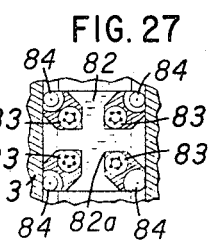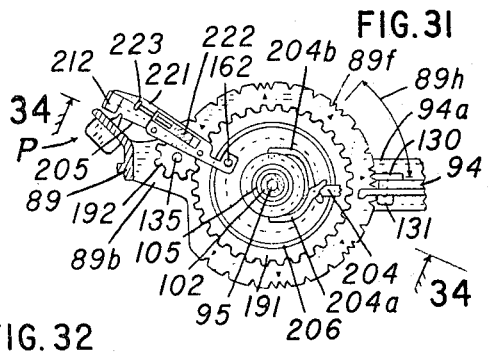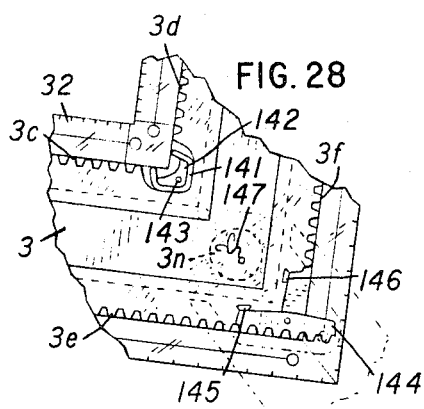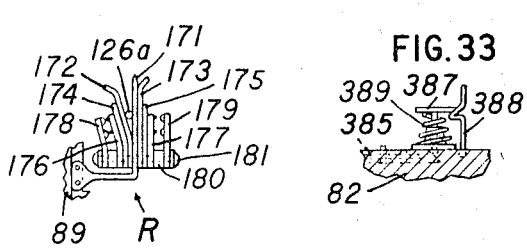

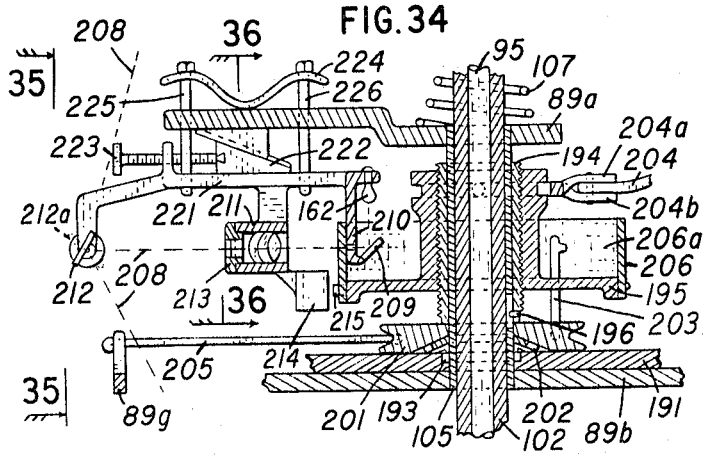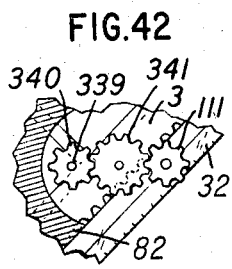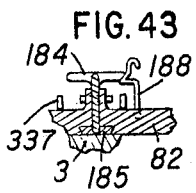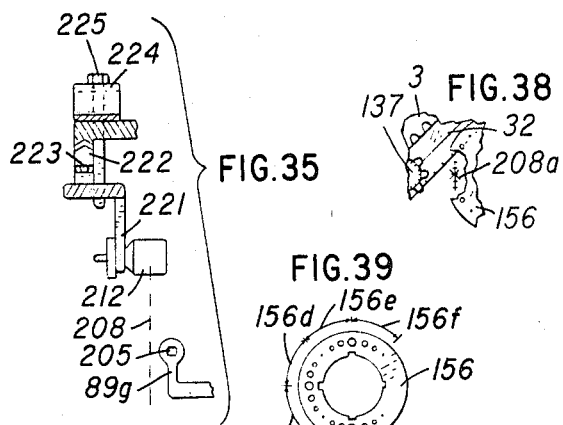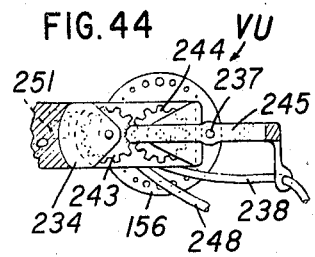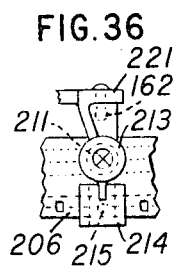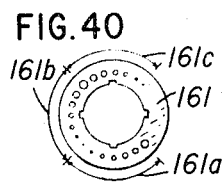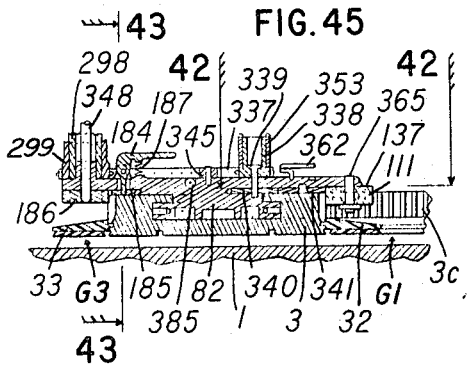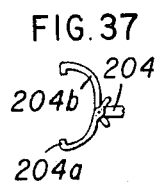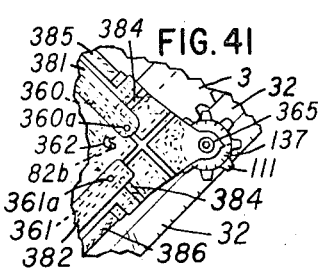

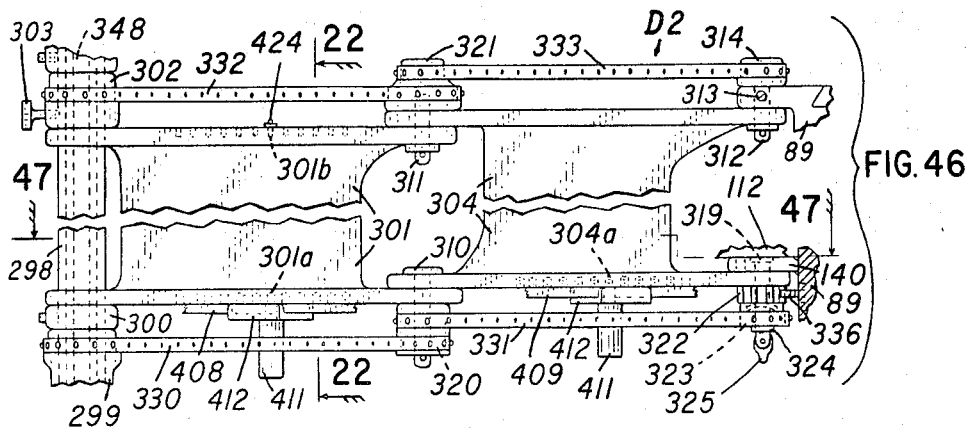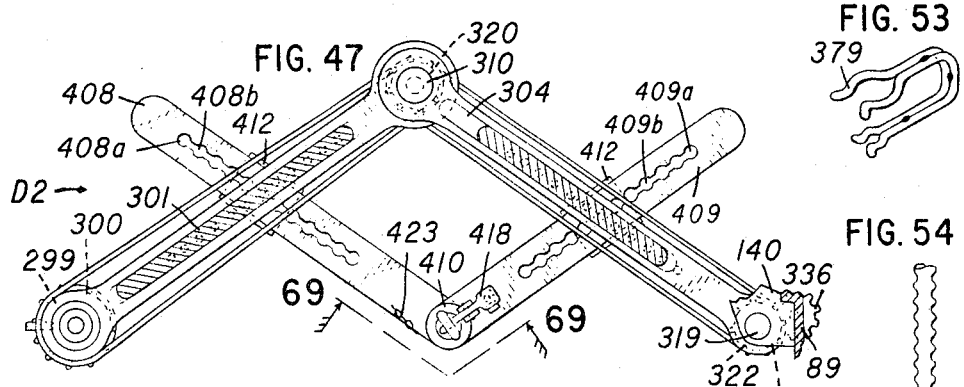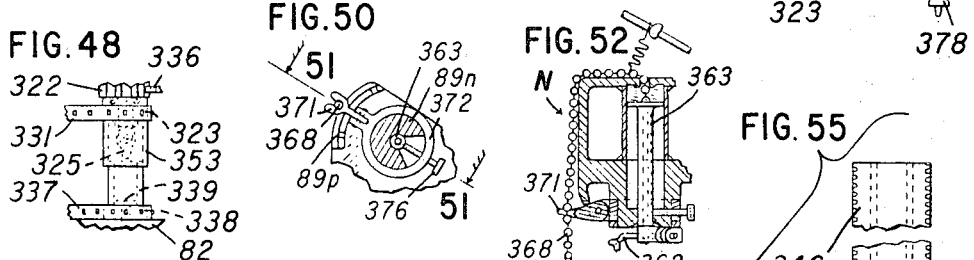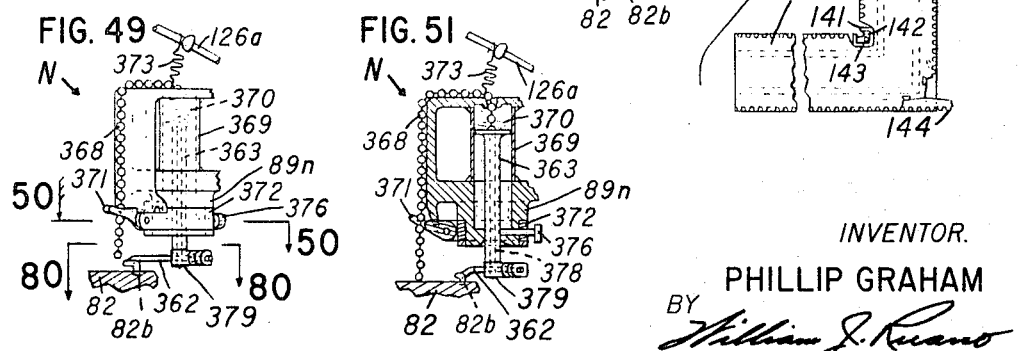
INVENTOR.
PHILLIP GRAHAM
BY
ATTORNEY

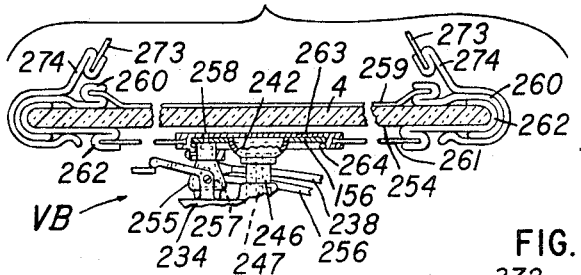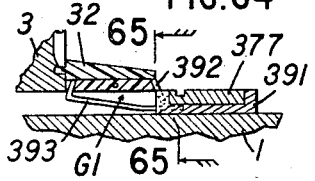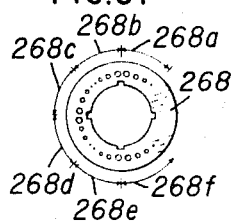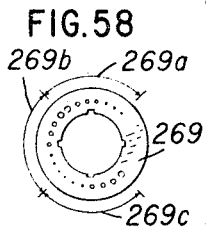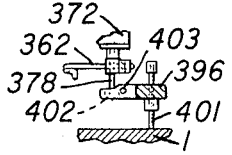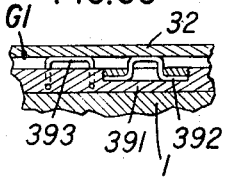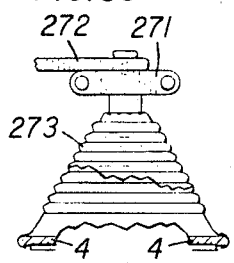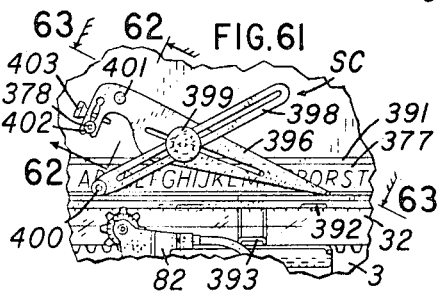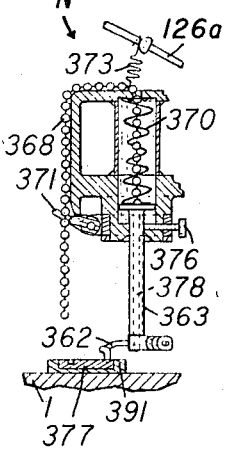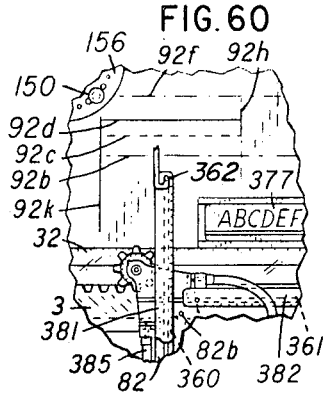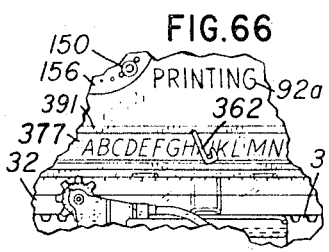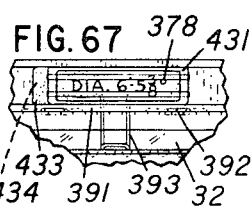

United States Patent Office 3,431,651
Patented Mar. 11, 1969

3,431,651
DRAFTING MACHINE
Phillip Graham, 2825 Glenmore Ave.,
Pittsburgh, Pa. 15216
Continuation-in-part of application Ser. No. 517,232,
Dec. 29, 1965. This application June 28, 1967, Ser.
No. 649,646
U.S. Cl. 33—18    44 Claims
Int. Cl. B43l 13/00

ABSTRACT OF THE DISCLOSURE

The drafting machine has a carriage which supports a semi-automatic selective marker, a selective automatic scale and a swivel arm that carries and allows the marker to sweep over a large area without shifting the square. The swivel arm includes a pantograph that coacts with templates that are attached to the square.

---

This invention relates to a semi-automatic drafting machine for engineering drafting work and the like to allow an engineering draftsman to rapidly, accurately, and simultaneously measure and draw precise legible, blemish-free sketches in less time, with less skill, and with less effort than with other types of drafting equipment that could be manufactured for the same or lesser cost. This application is a continuation-in-part of my co-pending application Ser. No. 517,232, filed Dec. 29, 1965, now Patent No. 3,328,883, entitled Drafting Machine. Applicant also claims rights to an earlier filing date to common subject matters that are described in the present application, which were also described in his earlier application Ser. No. 343,179, filed Jan. 28, 1964, entitled, Drafting Machine, now Patent No. 3,256,607. Application Ser. No. 517,232 is a continuation-in-part of application Ser. No. 343,179. The present application also describes improvements over the drafting machine means of my Patents Nos. 3,226,829, 3,120,060, 3,020,640, 2,882,604 and 2,701,417.

More particularly, the invention relates to a highly flexible, L-shaped square drafting machine having numerous means that coact to allow a draftsman to easily and simultaneously draw and scale precise straight lines with great accuracy and with great speed. The device also includes means to draw free-hand or template guided lettering, symbols, curves and the like. In addition, the machine includes pantograph means that coact with various types of templates to allow template characters to be enlarged or reduced. Also included are compass means to draw large and small arcs and circles. Furthermore, there are means that allow the L-shaped square to be selectively skewed to rapidly obtain opposite sets of angular positions for drawing oppositely sloped sets of lines and a selective spacer to allow the square to be shifted so as to draw uniformly spaced hatching lines and the like. Furthermore, the invention includes means to rapidly draw a fine, blemish-free ink or ink-like drawing on the underside of a raised drawing board. Thus the machine has the means to draw fine complete sketches without the use of other drafting tools and without interruptions to drawing actions. Although the sketch on the upper board would be the reverse of the sketch on a lower board, the upper sketch can readily be reversed when being reproduced as a blue print or lithograph. The invention includes an L-shaped square having a rack type track on which is mounted a carriage in geared relationship with the track, the carriage having a highly complex mechanism, including power means that is responsive to movements of a pencil-like shaped main control which the draftsman's hand manipulates with substantially free-hand drawing movements from a hand rest on the carriage, along with supplementary controls that are within fingertip reach of the hand rest.

There is need for a drafting machine embodying the present invention to speed up and lower the cost of engineering drawing work for research and development projects, particularly the need for this means to rapidly make fine blemish-free patent drawings and the like with ease. There is particularly need for the use of the machine to make fuller use of various types of templates, to allow fine characters to be made rapidly with ease. The flexibility of the present invention would readily allow experienced draftsmen to greatly increase their drawing speed and accuracy. In addition, the simplicity of the control means would allow trainees, frail operators, and physically handicapped draftsmen to draw rapidly and accurately with ease. Even handicapped draftsmen with only one useful hand could readily operate the machine because of the simple control means, power means, and the means to secure the machine in selective positions.

The drafting machine of the present invention differs from the L-shaped square drafting machine described in my co-pending application Ser. No. 517,232 by having numerous improvements. The present invention includes the features of the machine described in application Ser. No. 517,232 along with the following highly useful improvements:

These improvements include a swivel arm means on the carriage to greatly increase the sweep or reach of the marking and scaling means so as to allow a draftsman to draw a wider scope of lines without moving the L-shaped square laterally. The swivel arm supports a head. The head includes a marker, a projected scale, a power means, an automatic means to make dotted lines, and a tracer means. The arm has perforated bands and sprockets to maintain positive drive means between the L-shaped track rack on the square and the head mechanism. A clutch may be disengaged to allow straight lines to be drawn at right angles to an edge of the square and to allow lettering and other irregular lines to be drawn. The positive drive means causes the projected scale on the head to respond to the carriage movement along the track. The positive drive transmits the power from the motor to a driving gear that engages the track rack on the square. When a motor is not used, the positive drive causes the driving gear to rotate when the carriage moves and the movement causes the projected scale and dotting cams to rotate. The swivel arm also has perforated bands and sprockets to maintain the head in a constant angular relationship with an edge of the board. The swivel arm has pantograph means to allow a draftsman to use one conventional lettering template and the like to selectively make numerous differently sized characters, thus eliminating the need for having numerous costly templates. The present invention has improved means to allow a wider scope of parallel line groups to be drawn without shifting the square, in addition the means allows transverse lines that are at right angles to an edge, to be longer and to be measured as drawn without shifting the square. The drafting machine is further improved by being positioned in spaced relationship above a lower drawing surface, providing a considerable gap. The raised position of the square allows the extremities of the square to cantilever over and beyond a straight edge, when the square is skewed or tilted to a great degree—the legs of the square may extend far beyond the outer or extreme bearing pins, without increasing the length of the index arm. The raised position of the square allows templates to be partially projected under the square so they can coact with markers and tracers on the machine. The machine is improved by having template means slidably attached to the square to maintain alignment of the combination.

The improvements include a lower air-brush marker that can be moved laterally, with less effort, because it does not create friction with the lower drawing surface. In addition, the lower marker can be controlled with less motion, as control means can be selectively pivoted to within a smaller arc to provide a selective line width setting that allows the marker to maintain the selective width while drawing in any direction, such as when drawing lettering.

An object of my invention is to provide a flexible, semiautomatic, low cost L-shaped square drafting machine that can readily be operated rapidly with less shifting of the square, less effort, less skill, and less hand motion by a draftsman than can be done with other drafting machines of the same or lesser value—the machine having improved means to allow a draftsman to speedily, accurately, simultaneously and continuously draw and scale straight sketch lines, particularly the drawing of parallel lines that are parallel to an edge and the drawing of transverse lines that are at right angles to an intermediate portion of an edging, without moving the square. In addition, the machine includes improved means to draw free-hand and template guided letters, numbers and the like. Included in the improvements are compass means to allow small circles and arcs to be drawn. Furthermore, the machine includes pantograph means to enlarge and reduce template characters. The improvements include motion saving means to reduce the motion required to select the width of line for a lower marker. Also included are means to easily and quickly draw lines of selective contrast, including selective width straight lines that intersect and are at right angles to each other, also means to make dotted and other types of intermittent lines, means to uniformly space lines and means including an inverted marker to allow a draftsman to quickly make clean, blemish-free ink-lined drawings and the like that can be reproduced to make fine reproductions.

A still further object of my invention is to provide a novel L-shaped drafting machine that is simpler and faster to operate.

Other objects and advantages of my invention will become more apparent from a study of the following description taken with the accompanying drawings wherein:

FIG. 1 is a fragmentary plan view of a drawing board means with an L-shaped square drafting machine embodying the principles of this invention, positioned thereon in one of its many working positions;

FIGS. 2 to 6, inclusive, show fragmentary plan views of the drawing board means with the drafting machine illustrated in some of the possible positions other than that shown in FIG. 1;

FIG. 7 is an enlarged, fragmentary plan view of FIG. 1, showing in detail some of the principles of the machine;

FIG. 8 is an enlarged, fragmentary sectional elevation taken along lines 8—8 of FIG. 7;

FIG. 9 is an enlarged, fragmentary, sectional elevation taken along line 9—9 of FIG. 7;

FIG. 10 is a fragmentary, sectional, elevation taken along line 10—10 of FIG. 7;

FIG. 11 is an enlarged, fragmentary, sectional elevation taken along line 11—11 of FIG. 7;

FIG. 12 is an enlarged, fragmentary, sectional plan view taken along line 12—12 of FIG. 10;

FIG. 13 is a sectional elevation taken along line 13—13 of FIG. 12;

FIG. 14 is a fragmentary, sectional elevation taken along line 14—14 of FIG. 12;

FIG. 15 is a fragmentary, sectional plan taken along line 15—15 of FIG. 14;

FIG. 16 is a fragmentary, sectional elevation taken along line 16—16 of FIG. 12;

FIG. 17 is an enlarged detail of a typical nut used to position pin holders on an index arm;

FIG. 18 is an enlarged, sectional elevation taken along line 18—18 of FIG. 7;

FIG. 19 is an enlarged, fragmentary, sectional elevation taken along line 19—19 of FIG. 7;

FIG. 24 is a fragmentary, sectional plan view taken along line 24—24 of FIG. 20;

FIG. 25 is a fragmentary, sectional elevation taken along line 25—25 of FIG. 24;

FIG. 26 is an enlarged, sectional elevational view taken through the center of a carriage roller unit;

FIG. 27 is an enlarged, fragmentary, sectional view taken along line 27—27 of FIG. 25;

FIG. 28 is an enlarged, fragmentary, plan view showing track details at the center portion of the L-shaped square;

FIG. 29 is a fragmentary, sectional view taken along line 29—29 of FIG. 20;

FIG. 30 is a fragmentary, sectional view taken along line 30—30 of FIG. 20;

FIG. 31 is a fragmentary, sectional view taken along line 31—31 of FIG. 20;

FIG. 32 is an elevational view showing details of a jack switch;

FIG. 33 is a fragmentary, sectional view showing details of a typical control for a transverse lock;

FIG. 34 is an enlarged, fragmentary, sectional elevation taken substantially along line 34—34 of FIG. 7 and FIG. 31;

FIG. 35 is a fragmentary, sectional elevation taken along line 35—35 of FIG. 34;

FIG. 36 is a fragmentary, sectional elevation taken along line 36—36 of FIG. 34;

FIG. 37 is a fragmentary plan view showing a forked means that is spread to retract it;

FIG. 38 is an enlarged, fragmentary plan view showing a projected scale and crossed-hair's image adjacent to a marking element and an edge of the L-shaped square;

FIG. 39 is a plan view showing a turret with selective sized holes for an air-brush marker;

FIG. 40 is a plan view showing a different turret for the air-brush marker;

FIG. 41 is a fragmentary plan view showing details of transverse locking means;

FIG. 42 is a fragmentary sectional plan view taken along line 42—42 of FIG. 45;

FIG. 43 is an enlarged, fragmentary, sectional elevational view taken along line 43—43 of FIG. 45;

FIG. 44 is a fragmentary, sectional view taken along line 44—44 of FIG. 20;

FIG. 45 is a fragmentary, sectional view taken along line 45—45 of FIG. 24;

FIG. 46 is a fragmentary, elevational view showing details of a swivel arm;

FIG. 47 is a sectional view taken along line 47—47 of FIG. 46;

FIG. 48 is a fragmentary, elevational view showing a direct drive coupling means;

FIG. 49 is a fragmentary, elevational view showing details of a selector;

FIG. 50 is a fragmentary, sectional view taken along line 50—50 of FIG. 49;

FIG. 51 is a fragmentary, sectional view taken along line 51—51 of FIG. 50;

FIG. 52 is a view similar to FIG. 51, but showing a selector index pin in a retracted position;

FIG. 53 is a perspective view showing details of a needle-restraining clip;

FIG. 54 is an enlarged, fragmentary, elevational view showing details of a needle-like tracer pin;

FIG. 55 is a fragmentary plan view showing details of an upper L-shaped square;

FIG. 56 is a fragmentary, sectional, elevation similar to the top portion of FIG. 20, but showing a light-beam marking means;

FIG. 57 is a plan view showing a turret with selective sized holes for the light-beam marker;

FIG. 58 is a plan view showing a different turret for the light-beam marker;

FIG. 59 is a fragmentary, elevational view showing means to use a camera to record the sketching lines made with the light-beam marker;

FIG. 60 is a fragmentary plan view similar to FIG. 24 but showing a portion of the carriage positioned so as to draw a transverse line or a plurality of parallel lines without moving the L-shaped square;

FIG. 61 is a view similar to FIG. 24, but showing the carriage coacting with a template and a template scriber;

FIG. 62 is a fragmentary sectional view taken along line 62—62 of FIG. 61;

FIG. 63 is a sectional view taken along line 63—63 of FIG. 61;

FIG. 64 is an enlarged, sectional elevational view showing a template clamped to an L-shaped square;

FIG. 65 is a sectional view taken along line 65—65 of FIG. 64;

FIG. 66 is a view similar to FIG. 61, but showing a carriage tracer pin engaging a template;

FIG. 67 is a view similar to FIG. 66, but showing a guide for free-hand printing that is clamped to the L-shaped square;

FIG. 68 is a view similar to FIG. 52, but showing the selector index pin in a low position;

FIG. 69 is a fragmentary elevational view taken along line 69—69 of FIG. 47;

FIG. 70 is a sectional view taken along line 70—70 of FIG. 69;

FIG. 71 is a plan view similar to FIG. 61, but showing template means positioned out from the opposite side of the carriage;

FIG. 72 is a fragmentary, sectional view taken along line 72—72 of FIG. 20;

FIG. 73 is a fragmentary, sectional view taken along line 73—73 of FIG. 20;

FIG. 74 is a fragmentary, elevational view similar to a portion of FIG. 20, but showing the marker feeding mechanism as positioned when it is actively feeding out a conical marker;

FIG. 75 is a fragmentary, sectional view taken along line 75—75 of FIG. 74;

FIG. 76 is a fragmentary, sectional view taken along line 76—76 of FIG. 74;

FIG. 77 is a view similar to FIG. 68, but showing the needle-pin engaging a template;

FIG. 78 is a fragmentary, elevational view showing a template-scriber engaged to a pivot arm;

FIG. 79 is a view similar to FIG. 66, but showing a template positioned closer to the carriage;

FIG. 80 is a sectional view taken along line 80—80 of FIG. 49;

FIG. 81 is a fragmentary, sectional, elevation showing compass means on the selector;

FIG. 82 is a fragmentary, elevational view showing a ball-point pen marker on the carriage;

FIG. 83 is a plan view similar to FIGS. 1 and 2, but showing the square coupled differently to a conventional drafting machine track;

FIG. 84 is a plan view similar to FIGS. 1 and 83, showing the square coupled differently to a conventional drafting machine track and FIG. 85 is a plan view similar to FIGS. 1 and 6, but showing the square coupled differently to a conventional drafting machine track.

Figure 20:
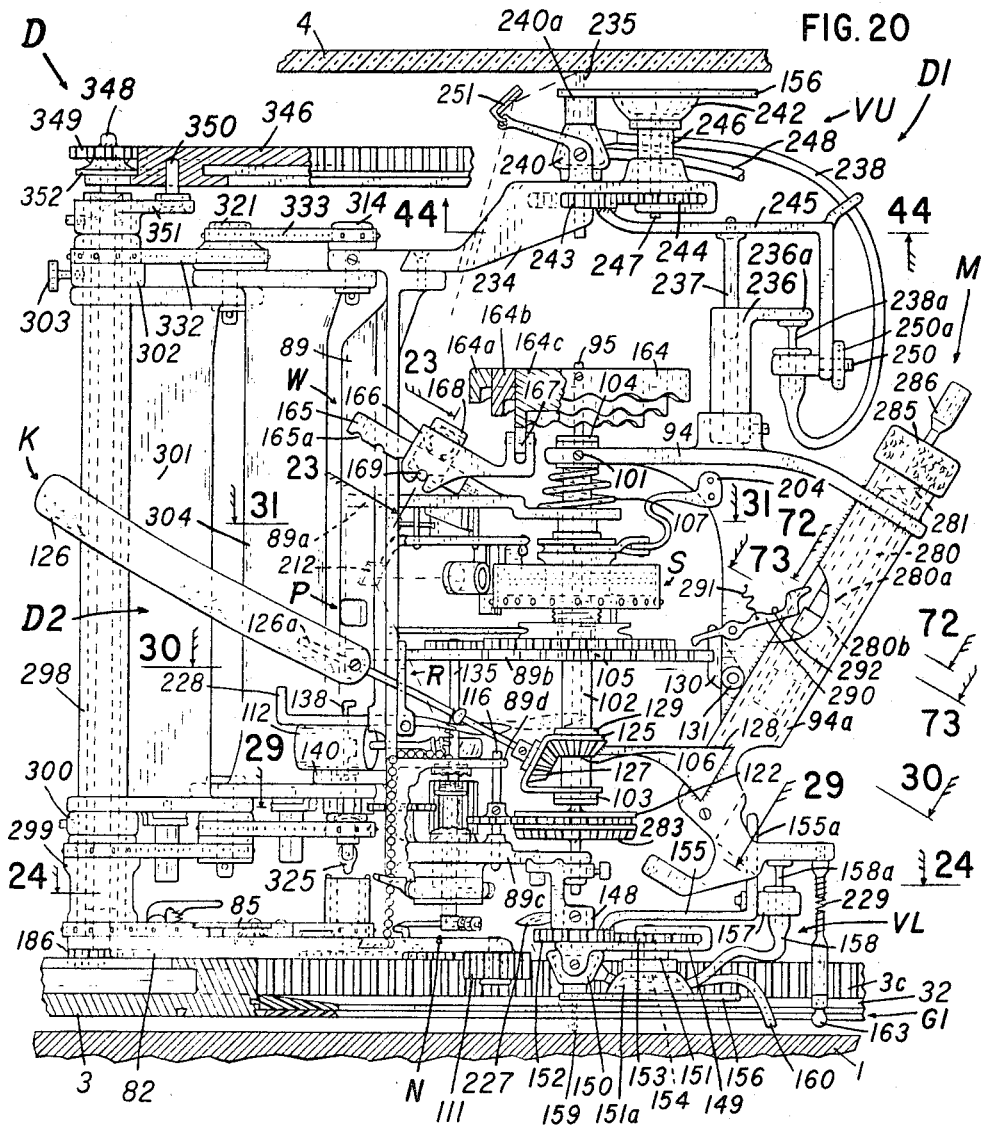
FIG. 20 is an enlarged, fragmentary, sectional elevation taken along line 20—20 of FIG. 7, showing a marker carriage.

Referring more particularly to FIG. 1 and FIG. 7, a lower drawing board 1 has a conventional-like drafting machine track or guide means B mounted on it. The board 1 may be made of any suitable materials, such as steel, wood, plastics, or glass. The track means B has a straight edge 2 to which is attached a square or L-shaped square drafting machine C, which embodies many of the principles that are new and useful. The L-shaped square C is generally referred to as a square, since that is the term used to designate similar types of squares. Most draftsmen would prefer to have the board 1 and the square C positioned with the drawing surface of the board being in a substantially horizontal plan, therefore, for purposes of clarity, the description recites such positioning. The board 1 and the machine C may also be used when they are tilted or positioned vertically.

The square C has a lower L-shaped square frame or body 3 which is symmetrical about its transverse horizontal axis. The body 3 is formed by legs 3a and 3b.

The machine C includes a marker carriage D. The carriage D has a head portion D1 and a swivel arm D2. The arm D2 supports the head D1. The carriage D includes semi-automatic means that coact to allow a draftsman to rapidly make a complete drawing. The carriage D is engaged to an L-shaped track portion of the body 3. The head D1 supports a lower air-brush marker VL. The marker VL marks on the board 1. An upper drawing board 4 may be positioned above the carriage D in parallel relationship with the board 1. Four supports 5 engage the board 4, and the board 1 or the like. An inverted or upper air-brush marking means VU, on the carriage D, is controlled so as to cause it to selectively mark on the board 4. The board 4 allows a draftsman to easily and quickly make unsmeared and unblemished inked drawings and the like. The board 4 may be removed or omitted when such fine drawings are not required. My patent No. 3,226,829, describes in detail the advantages of drawing on such an upper board. The use of the upper board 4 will be described fully hereinafter.

The track means B has a protractor carriage 6. Track bars 7 and 8 form a movable track or carriage portion upon which the protractor carriage 6 is mounted. The bars 7 and 8 are fastened to a longitudinal carriage 9 and to a diaphragm 10. The carriage 9 slidably engages a longitudinal track 11. The track 11 is supported by brackets 12. The brackets 12 are fastened to the board 1 or the like. The carriage 9 has a threaded hole into which a set-screw-like lock 13 is projected. The carriage 9 can be locked to prevent it from moving along the track 11 by turning the handle of the lock 13. The carriage 6 has a hole to slidably engage the bar 7 and it has a groove to slidably engage the bar 8. The carriage 6 has a threaded hole into which the set-screw-like lock 14 projects. The carriage 6 can be locked to prevent if from moving along the track formed by bars 7 and 8 by turning the handle of the lock 14. The lock 14 can be unlocked to allow the straight edge 2 to be pivotally raised with the square C attached to it when the upper board is removed or omitted, so as to allow the square C to be moved over the board 1 from one position to another position that is a considerable distance away, thereby eliminating smearing action caused by friction between the drawing surface of the board 1 and the bottom of the square C. The lock 13 can be unlocked to allow the track formed by the bars 7 and 8 to be pivotally raised along with the straight edge 2 and the square C when the upper board 4 is removed or omitted so as to allow the square C to be moved from one position to another position. The square C may be rotated and may be used against the opposite edge of the straight edge 2.

A conventional cable-rigged, parallel straight edge or the like (not shown) may be used instead of the straight edge 2 and other parts of the track means B. A conventional hinged parallelogram type of drafting machine arm as shown in my Patent No. 3,120,060, may be used instead of the track means B.

In general, the parts for the L-shaped square, the carriage D and the track B may be made of various materials, including: steel, aluminum, brass, plastics, magnesium and titanium, except that transparent scale portions would be made of clear plastic. The carriage D, particularly its head portion D1 and the swivel arm D2, should be made of the lightest and strongest suitable materials that are available, the usage of which are economically feasible, for purposes of illustration, all except transparent portions have been illustrated with cross-hatching that is usually used to indicate steel.

The body 3 has three leg-like offsets 3n that project downwardly so as to create a gap between the major portion of the body 3 and the board 1. The gap largely prevents the body 3 from rubbing and smearing sketch lines. In addition, the gap allows templates to slide partially below the square. Furthermore, the gap allows the end portions of the body 3 to move above the straight edge 2.

Conventional drafting machine scale clips 15 allow the square C to be connected to conventional drafting machine tracks or the like, as shown in FIGS. 83 and 84. The clips 15 are positioned in recesses in the body 3.

The square C can be selectively tilted or skewed with respect to the straight edge 2, to enable a draftsman to readily draw sloping lines. The term tilted is used generally in this specification to describe the tilt or skew, because the square C is shown in a tilted position in FIGS. 1, 2, 5 and 6 with respect to the so-called horizontal position of the straight edge 2.

When the draftsman uses the carriage D, as it is shown positioned in FIGS. 1 and 7, he draws along the inside edges of the square C. This arrangement allows the draftsman to draw two intersecting straight lines at right angles to each other to form a corner without moving the square C. If the draftsman prefers to draw with the carriage D along the outside edges of the square C, particularly for the combination shown in FIG. 84, the carriage D is removed from the square C and turned one hundred and eighty degrees to be re-engaged with the track portion of the body 3.

The square C can be used to aid a draftsman to draw a complex sketch, such as a detail drawing of the tower design sketch 16, shown in FIG. 7. My Patent No. 3,256,607 thoroughly describes how a like L-shaped square may be selectively positioned and manipulated so as to allow a sketch like sketch 16 to be drawn easily and quickly.

An index arm E holds selectively positioned pin holders H1 and the like with pins for selectively tilting the square C. This indexing means allows the draftsman to set up the square C for maintaining all the indexed angles, or slopes, that are to be used for drawing a particular sketch, such as the sketch 16. Simple operations can be made to change the indexed position back and forth for various right and left or reverse sets of angles and to the non-tilted positions. Pin arms 24, 25, and 26 are attached to the body 3 with plugs 27 engaging sockets in the body 3 so as to allow the pin arms to be removed when the carriage D is to be used to draw along the outside edges of the square C when the square is mounted directly to the carriage 6, as shown in FIG. 84. The pin arms 24, 25, and 26 have threaded holes to take pins 28, 29, and 30. These pins may be similar to a pin 31. The pins 28, 29, and 30 form bearing points that can be made to selectively bear against the edge of the straight edge 2, to adjust the square C to various tilted positions. Normally, the pins 28, 29 and 30 are inserted fully, and allowed to remain in that position. The pins may be raised to retracted positions, like the position 29a.

Protractor-clamps F1, F2, F3, and F4 are engaged by the pins 28, 29, 30 and 31. The pins are retracted to uncouple them from the protractor-clamps. The clamps F1, F2, F3, and F4 are selectively coupled to the straight edge 2 to restrain the square C from tilting out of selective tilted or non-tilted position. These protractor-clamps may be adjusted so as to be slidable along the straight edge 2, including sliding when they are clamped to it, or they may be adjusted so they cannot slide. These clamps may be omitted when the drafting machine is to be used to a limited degree, or the clamps may be disengaged when they are not required for a lengthy sketching operation. Clamp F1, which is a typical clamp, is a self-aligning and self-coupling clamp.

The square C has transparent frame edgings 32 and 33, engaging the frame leg 3b. Similar edgings 34 and 35 engage the leg 3a.

Scale assemblies G1, G2, G3, and G4, may be positioned below transparent edgings 32 and the like. As shown in FIG. 8, scale G1 or the like has a transparent plastic scale 41, which may have a reinforcing wire 42 embedded it it. Small balls 43 are attached to the ends of the wire 42 so the scales G1 and the like may be detached or attached quickly, to sockets in the edgings. The outer end of each wire 42, has a spring portion 42a to keep the scales taut.

The pins 28, 29, and 30 may be fixed permanently to the pin arms 24, 25, and 26. The pins 28, 29 and 30 may be used without the clamps, for limited operations. The square C can be used to an extent without the pins by causing the partially embedded magnetic clamps 44, 45, and 46 to act as the outside corners or bearing points and clamps, to hold the square to the straight edge 2. A straight edge 2 that is not made of steel, may have a strip of iron 47 to coact with the magnetic clamps. These magnetic clamps restrain the square C from pulling away from the straight edge 2 while they allow the square to be slid along the edge. The magnetic clamps 44, 45, and 46 are offset from the edgings 33 and 35 so as to form projections. Two of these projections along one of the edgings 33 or 35, engage the straight edge 2 to space the adjacent edging away from the straight edge 2 when the square C is positioned against the straight edge in parallel relationship, thereby providing a gap to allow the draftsman to scale and draw within the gap. When the pins 28, 29, and 30 are used, they act as projections, thus causing the magnetic clamps 44, 45, and 46 to be inactive. The ends of the pins engage plain holes in the protractor-clamps. The pins may be magnetized to cause them to act as clamps. A resilient wire or key 48 extends through the clamp F1. The wire 48 springs aside when the pin 29 is inserted or removed. The clamp may have a hard sleeve 49.

The straight edge 2 may be pushed up and down the board 1, when the lock 13 is locked and the lock 14 is unlocked. The square C may be kept against the straight edge 2 and be slid with it and then along its length. The straight edge 2 with the square C attached to it may be moved longitudinally by unlocking the lock 13.

As shown in FIGS. 7 and 10, the pin 31 is held in the pin holder H1 that is attached to the index arm E. There is a means to selectively set or position the pin holder H1 so as to create an indexed location to obtain the desired tilted or skewed position for the square C for a drawing operation. Other identical pin holders H2, H3, H4, and H5 are shown. The holders are all attached and selectively positioned to the index arm E for the various slopes or angles required for drawing a given sketch such as the sketch 16. The pin 31 projects down so that it can be made to bear against the edge of the straight edge 2. The pin 31 is located at a position which is equidistant from the pins 28 and 29. When the pin 29 and the pin 31 bear against the straight edge 2, as shown in FIG. 7, a selective angle or bevel is created between the straight edge 2 and the leg 3b of the square C, thus positioning the square C so as to allow the drawing of the lines for the left hand leg of the tower shown in the sketch 16 or the like. After the left hand leg of the tower in sketch 16 or the like is drawn, or partially drawn, the square C may be pivoted or rocked on pin 31 until the pin 28 bears against the straight edge 2, creatng the position shown in FIG. 2, which has the same degree angles that were created in the arrangements shown in FIGS. 1 and 7, except that they are the left, opposite hand or reversed. With the set-up shown in FIG. 2, the right hand leg of the tower or the like can be measured and drawn.

So called horizontal and vertical lines can be drawn with the square C, after retracting the pin 31 and positioning the square as shown in FIG. 3, with the pins 28 and 29 bearing against the straight edge 2.

The index arm E has a T-shape formed with an arm portion 50 and a spreader portion 51, joined together. The ends of the spreader 51 have hinged connections to engage hinge sockets 24a, 25a and 26a on the pin arms.

The arm E may be pivoted to the raised position E1 to retract the pin 31 from its engagement with the edge of the straight edge 2 while the square C is being pivoted from a tilted position to a non-tilted position.

The arm 50 is threaded and slotted to allow the pin holder H1 and the like to be attached to it and be adjusted laterally along it. The pin holder H1 has a pin retainer 52, an adjusting nut 53, an indicator 54, and an elastic lock block 55. The retainer 52 has a threaded hole. The indicator 54 is soldered to the retainer 52. The nut 53 may be formed by nut portions 53a and 53b that are hinged together, as shown in FIG. 17. The retainer 52 is inserted in the slot in arm 50 at an approximate position to where the pin 31 is to be positioned. The nut 53 is opened and clamped around the arm 50 and the retainer 52, locking the retainer to the arm 50. The nut 53 has a hook and notch engagement to lock it into a circle when the nut portions 53a and 53b are pressed together. The nut 53 is made of spring steel or the like to allow its parts to be sprung. The pin 31 is inserted into the retainer 52. The nut 53 is rotated to obtain vernier adjustment to position the retainer 52 laterally with respect to the edging 33 and thus to selectively vary the distance between the edging 33 and the pin 31 to obtain selective tilting of the square C. The top and bottom of the retainer 52 are grooved, but not threaded, to receive the nut 53. The groove and nut engage to lock the parts together. The indicator 54 has a needle pointer at each of its ends; the pointers register the tilt angle on the protractor-clamp F3. The elastic block 55 bears against a small area of the thread of the nut 53, restraining the nut from creeping. A paper tab 61 is useful to write the angular setting for a position of the pin holder H1. The index arm E may be removed to retract the pin 31 from engagement with the straight edge 2.

A protractor 62 is attached to the arm 50 and the spreader 51. When the square C is skewed or tilted, as shown in FIG. 2, the degree of tilt is read against the edge of the straight edge 2. The pins 29 and 30 are made to bear against the straight edge 2, to position the square C as shown in FIG. 4.

The square C may be positioned as shown in FIG. 5, by moving the arm E to the position shown by the dot-dash outline E2, and by tilting the square so the pins 30 and 31 bear against the straight edge 2. The selective positioning means for the pins and straight edge means or the like that maintain the square C into a set position as it is swept over a drawing, is defined as an angular positioning means. The pin 31 is switched to holders H2, H3 and H4 to obtain different slopes.

Pins identical to the pin 31 may be inserted in all of the pin holders to make them readily available for use. When the pins are not being used, they would be kept in a raised retracted position, like the position 29a shown by a dot-dash pin outline in FIG. 9.

The protractor-clamps F1 and the like may be omitted or be disengaged by removing or raising the pins. The indicator needles 63 point to both the angles on the protractor part 64 for the set-up on the square. The protractor 64 may be made of magnetized metal to hold it to an iron edged straight edge, also to hold the square against an iron surfaced drawing board 1. The part 64 has a hinged arrangement with a hinge part 65, and a threaded catch arm 66. The threaded shaft of arm 66 is rectangular to fit rectangular holes in hinge part 65, so the arm 66 cannot rotate.

The effective length of the arm 66 is varied to allow the clamp to fit the width of the straight edge 2. This adjustment is made by turning the threaded nut-like part 67. The nut 67 has spaced holes around its perimeter for attaching the handle 68. After the effective length of the arm 66 is adjusted to suit a particular straight edge 2, the handle 68 is inserted in one of the spaced holes in nut 67. A thin elastic washer 69 around the arm 66 prevents the nut 67 from creeping. The handle 68 is pivoted from right to left to tighten the clamp F1, and it is pivoted oppositely to loosen the clamp, to adjust for play. The handle 68 is pivoted to the extreme tightening position when it is desirable to tighten the clamp F1 so it will not slide, which is useful in keeping the square C positioned for drawing vertical lines longer than the vertical leg of the square. The hinge arrangement formed by the protractor 64 and the hinged part 65 has a machine screw 70. The screw 70 may be tightened to prevent any hinge action. The beveled end of the arm 66 and the loose hinge action allows the arm 66 to rise and slide over the top of the straight edge 2, and then to drop to engage the straight edge 2 securely.

A slightly raised fragmentary dot-dash outline 66a of the arm 66 and the hinge part 65, shown in FIG. 9, shows the elevated positions of these parts when they are sliding across the top of the straight edge 2. A highly raised retracted position of the arm 66 and the hinged part 65 is shown by a dot-dash outline 66b in FIG. 9. The index arm E, as positioned in FIG. 7, would at times prevent retraction by hinging action of the arm 66 and the hinge part 65 on clamp F3. When that condition occurs, the pin 31 may be disengaged from the clamp F3, or from the index arm E, and the clamp F3 together to allow the square C to be selectively positioned.

A spacer J has a clamp or anchor 71 that bears against the straight edge 2 like protractor part 64 bears. Protractor-clamp parts 65, 66, 67, 68, 69, and 70 are assembled with the clamp 71 so that it can be clamped tightly or loosely to the straight edge 2 or be uncoupled. The handle 68 is manipulated to tighten the clamp 71 to prevent it from moving when drawing uniformly spaced hatching and shading lines or the like. A spacer bar 72 is a stiff member having uniformly spaced, countersunk, index holes 72a. The bar 72 has a collar-like end portion 72b which is fastened to the collar of the clamp part 64 with a set screw 73, as shown in FIGS. 14 and 16. The bar 72 may be selectively skewed to vary the angularity between it and the straight edge 2 to vary the distance from one hole 72a to the next hole, the distance being measured parallel to the edge of the straight edge 2. The protractor of the part 64 on the clamp F3 can be used to set the angularity of the bar 72 to suit a tabulation for such settings. The set screw 73 is tightened to maintain the angularity of the bar 72. The collar of the clamp part 64 may be notched or recessed every five degrees to allow the angularity to be varied by five degree units and to allow the set screw 73 to engage a notch to prevent slippage. The clamp F3 is adjusted so that it is loosely clamped, so it can slide on the straight edge 2 while drawing lines with the aid of the spacer J.

A slider 74 slides on the spacer clamp 71 and the bar 72. The broad slider bottom 74a loosely holds the slider 74 to the groove in the spacer clamp 71, as shown in FIGS. 18 and 19. The spacer control or rocker 75 is pivotally mounted on the slider 74. The control 75 has an index pin portion 75a that is engageable with the index holes 72a. The control 75 has a wide key-like portion 75b that is pressed downwardly to cause the pin 75a to retract from a hole 72a. A spring portion 75c tends to force the pin 75a into the closest hole 72a when the hand pressure is released from the key 75b. When a set of hatch lines are to be made, the draftsman tightly clamps the clamp 71 to the straight edge 2, in a position close to the loosened clamp F3. Then he moves the slider 74 and the control 75 until he manipulates the pin 75c into the hole 72a closest to the clamp F3. Then he draws the first line along an edge of the square. He then presses the key 75b and moves the square C to the right slightly and releases the pressure on the key 75b so the pin 75a engages the next hole 72a. Then, the next line is drawn. The spacer J may be selectively coupled to the square C. The draftsman may shift the spacer J and the clamp F3 by removing a clamp F1 or F2 and shifting the clamp F3 to its place. Such positioning of the spacer J is shown in FIGS. 3, 4 and 6.

When the spaced lines are to have a slight slope, such as a slope parallel to the edging 32, as the edge is positioned in FIG. 7, the draftsman may pivot the straight edge 2 downwardly ninety degrees to a position indicated by the fragmentary outline 2a, by manipulating the controls of the protractor on the carriage 6, then drawing the spaced lines along the edging 34. The spacer J may be removed or be omitted when there are no uniformly spaced lines to be drawn.

The carriage D may have a simple pencil-like shaped flexible main control K which is gripped and manipulated like a pencil. The control K can be used alone to a large extent to manipulate the carriage to cause a wide scope of straight line marking and scaling actions. The control K also coacts with supplementary controls to allow a wider scope of drawing work to be made, including the making of dotted or other types of intermittent lines; the making of free-hand or template guided printing and symbol characters and the making of enlarged or reduced characters with pantograph means; the making and scaling of numerous straight parallel lines without moving the body 3; and the making and scaling of short straight lines at right angles to an edging 32 and the like, without moving the body 3. The carriage D may have a pivot arm M that can be selectively controlled by movement of the control K to cause marking means to make lines of selective width or lines that otherwise contrast with each other, including lines of different colors.

The carriage D has a chassis or base 82 that rolls or slides along the L-shaped track or path portion formed by the body 3. As shown in FIG. 25, overhanging portions of the body 3 confine the chassis 82 to prevent the carriage D from tilting or overturning. The carriage D may ride on rollers or casters 83 to allow the carriage D to be propelled with little force. The rollers 83 may be made with very small ball bearing units concentric about a ball 83a, as shown in FIG. 26. Wheels 84 at the corners of the chassis 82 may be used to take lateral thrust of the carriage D against the body 3. The wheels 84 may be made of small ball bearing units. The chassis 82 may be made wholly or partially of porous bronze bearing metal, that can hold lubricating oil, thereby eliminating the need for wheels.

A hand-rest 85 is fastened to the chassis 82 with a pin 86. An eccentric spring washer 87 bears against the hand-rest 85 to tilt the hand-rest slightly so the index pin 88 does not engage any of the three index holes that are arcuately spaced about the pin 88. The draftsman pivots the hand-rest 85 until it is suitably positioned and the pin 88 is aligned with one of the index holes. The draftsman's hand bears on the hand-rest 85 and causes it to deflect by pivoting downwardly slightly so the pin 88 engages one of the index holes, so as to prevent the hand-rest 85 from pivoting while the draftsman is drawing.

The head portion D1 includes a head frame 89. The frame 89 is pivotally engaged and supported by the swivel arm D2. The swivel arm D2 allows the head D1 to be moved laterally with respect to the chassis 82. A phantom outline D1a, shown in FIG. 7, indicates a position to which the head D1 may be moved. A selector N has an indexing means to allow the head D1 to be indexed to a fixed position so it cannot move laterally with respect to the chassis 82, or be selectively indexed to allow the head D1 to be moved laterally when making printing 92a as shown in FIG. 66, and other line work, including drawing a plurality of parallel lines, such as lines 92b, 92c, 92d, and 92f shown in FIG. 60, also when drawing short lines 92h and 92k at right angles to an edging.

As shown in FIG. 20, the pivot arm M has a pivot arm frame 94. The frame 94 includes an inclined sleeve or tubular frame portion 94a. The frame 94 pivots laterally about the vertical axis of a shaft 95. A set screw 101 in the frame 94 engages a tube 102. The shaft 95 projects through the tube 102. A bearing collar 103 below the tube 102, and a bearing collar 104 above the tube 102, are pressed to the shaft 95 and to the tube 102 to hold the shaft 95 and the tube 102 in proper positions with respect to each other. The collars 103 and 104 may be small ball bearing units that can take the vertical and lateral thrusts of the shaft 95. As shown in FIG. 34, a fixed tube 105 is pressed or soldered to the frame offsets 89a and 89b. The tube 105 acts as a bearing to hold the tube 102 in position. The frame offset 89c has a bearing type of hole to hold the lower portion of the shaft 95 in proper alignment. A hole in a beveled gear 106 and a hole in the top portion of the arm frame 94 keeps the arm M in proper alignment with the tube 102. The shaft 95 and the tube 102 are mounted so as to be movable vertically along with the arm M in response to vertical control movements of the control K. The draftsman can readily pressure the control K downwardly to depress the arm M downwardly, the downward movement causes lower marker VL to mark on the board 1 and the upper marker VU to mark the drawing surface on the board 4. A spring 107 tends to raise the arm M when the draftsman discontinues downward pressure on the control K. The rising action stops the marking action. The lower marker VL is offset from the edging 32 so the marking action of the marker can be readily seen while drawing.

A gear 111 is mounted on the chassis 82. The gear 111 remains in constant engagement with the rack track portion 3c or the like on the body 3. The gear 111 is interconnected with gear means on the head D1 so as to cause automatic scaling with the projecting scale S on the head D1, also to cause selective dotted lines or other types of intermittent lines to be made automatically when required with the intermittent line cam means W. Furthermore, the interconnected gear means allows a reversible electric motor 112 to drive the carriage and its marking and scaling means. When a drawing is to be made on the board 1 with pencil lead or the like, such as for the present day requirement for using plastic leads on "Mylar" drafting film, the marker VL is removed and a conical tipped pencil lead marker 113, is inserted in its place, as shown in FIG. 74. The interconnected gear means can rotate the lead 113 to cause its point to remain in a true cone, to allow selective width lines to be made when the arm M is selectively pivoted. The gear means can automatically feed lead 113, to compensate for the lead consumed.

A gear 115 is keyed to a shaft 116 with a set screw. Holes in the offsets 89c and 89d act as bearings on the shaft 116. A gear 122 is soldered or otherwise fastened to the shaft 95. When the arm M is raised by a movement of the control K, a flange on the gear 122 pressures the periphery of the gear 115, causing the gear 115, and the shaft 116 to rise. When the arm M is pressured downwardly by a movement of the control K, a flange on the gear 122 pushes the gear 115 downwardly, along with the shaft 116.

The pivot arm frame 94 may be gripped and be pivoted laterally to allow the drawing of selective width uniform lines along the edges of the square C. The arm 94 would only have to be pivoted forty-five degrees for most usages of the machine C, particularly when the upper and lower markers being used are air-brushes. When a pencil lead marker 113 or the like is used, the arm 94 is selectively pivoted ninety degrees when drawing along the inside edge of the square C. When a pencil marker 113 is used to mark along the outside of the square C, as shown in FIG. 84, the arm 94 may be selectively pivoted two hundred and seventy degrees. Such gripping and pivoting of the frame 94 would be difficult to accomplish. It would require considerable time, and the pivoting action would tend to cause the draftsman's hand to smear the drawing surface. The arm M may be controlled more readily by movements of the main control K which the draftsman can grip, as he can manipulate the control K and thus the arm M much faster and with less effort than would be required to grip the pivot arm frame 94 and manipulate it. The control K allows the draftsman's drawing hand to remain in position on the hand-rest 85 while drawing and manipulating the controls.

The control K has a U-shaped member 125 which pivotally engages the tube 102. A pencil-like shaped flexible control handle 126 has the small flexible shaft 126a keyed to it with a set screw. The hub of a beveled gear 127 projects through a hole in the U-shaped member 125. The shaft 126a projects into the beveled gear 127 and the gear is keyed to the shaft with a set screw. The gear 127 engages the gear 106 that is concentric with the tube 102. An arm 128 is welded to the gear 106 and to the tubular portion 94a. The gear 106 may be welded to the tube 102. The gear 127 and 106 are held in alignment with the U-shaped member 125. A collar 129 on the tube 102 holds the member 125 against the gear 106. A draftsman would lower or depress the control K to cause the markers VL or the like to draw and he would raise the control K to stop the drawing action. The draftsman rotates the control handle 126 by rolling it slightly between his thumb and index finger to cause the shaft 126a and the gears 127 and 106 to rotate, thus pivoting the arm M with slight hand motion, thus allowing the draftsman's hand to maintain a position on the hand-rest 85. The draftsman's drawing hand can also manipulate other controls that are within fingertip reach of the hand-rest 85.

The draftsman may loosely hold the control handle 126 while manipulating it to draw straight lines without sacrificing accuracy in his drawing actions, since there is an automatic pivot angle locking means to maintain the arm M in a selective pivot angle position or zone while drawing a line. As shown in FIG. 31, the pivot angle locking means includes spaced radial index notches 89f on the offset 89b. The notches are pivot angle stations. The offset 89b has six sets of pivot angle zones 89h, which are forty-five degrees each, the zones are divided by arrow markings. Each zone 89h has four index notches 89f to allow four different width lines to be made. Notches 89f that are at the limits of zones are common for adjoining zones 89h. Where there are three notches adjoining each other, the two outer notches are for making selective colored lines, the common notch between zones is not used for such color line work. The wedge or tooth-like portion 130 on the arm M is selectively engaged with a notch 89f when the arm M is lowered. The engagement of tooth 130 to a notch 89f locks the arm M into a pivot angle position. The draftsman may selectively pivot the arm M to various pivot angle stations 89f, so as to draw lines of various selective uniform widths, or lines that otherwise differ or contrast with each other, including lines of selective color, also lines that differ in width and color.

When the draftsman is using a conical marker 113, and he prefers to draw selective width lines at ninety degrees to each other without raising the arm M to change the pivot angle, he may pivot the tooth 130 to retract it away from the offset 89b. A threaded finger wheel 131 may be rotated to bind the tooth 130 to an operative position or to a retracted position.

The motor 112 allows the carriage D to be power driven along the body 3 while the draftsman's drawing hand rests on the carriage D, thus eliminating manual force to propel the carriage D, while drawing most straight lines. The draftsman pivots the control K laterally, slightly to the left or right to selectively position it above positions on the jack or switch R, shown in FIGS. 20 and 32. The switch R, shown in FIG. 32, has pairs of contact prongs that are conventionally wired to an electrical power source, a control panel P and the reversible electric motor 112. The prongs of the switch R are selectively engaged to cause contacts to selectively power the motor 112 to cause it to rotate in one direction or to rotate in an opposite or reversed direction to thus selectively move the carriage D in either direction with power means. As shown in FIG. 30, a worm gear 133 is keyed to the shaft of the motor 112. The worm gear 113 engages a pinion gear 134. The gear 134 is keyed to the shaft 135. A gear 136 is also keyed to the shaft 135. Gear 136 engages gear 115. When the motor 112 is activated by the control K selectively engaging the switch R, the motive force from the motor 112 is transmitted through the interconnected gearing to the gear 111, thereby propelling the carriage D. When the gear 111 rotates, a thin rotary scale 137 on the top of the gear 111 is rotated, the interconnected gearing also drives the projecting scale S to cause it to rotate. When the draftsman prefers not to use the motor 112, he may inactivate it by switching off the current at the panel P and by pivoting the handle on the eccentric 138, to cause the motor 112 to pivot laterally, thus causing the worm gear 133 to disengage from the gear 134. The worm 133 is re-engaged with the pinion 134 by pivoting the handle of the eccentric 138 to allow the spring 139 to force the motor 112 to return. The motor 112 is pivotally mounted on the bracket 140. The bracket 140 is fastened to the frame 89. The motor 112 may be omitted if the draftsman prefers to manually work the carriage D.

The carriage D may be moved laterally with the power means without marking, so as to move the marker VL and the like to a new starting position. The arm M can be depressed partially so as to cause the switch R to make contacts to suit the directional movement required, but not to the extent that would allow the markers VL and VU to be activated.

When the arm M is lowered to the position shown in FIG. 20, the motor 112 causes the gear 111 to rotate against the rack track portion 3c of the body 3. The rack positions may be cast, cut, or be inserted rack members. When the motor 112 is not used, manual effort causes the carriage D to move. The movement causes the gear 111 to rotate. The geared engagement of the carriage D to the track rack 3c and the like, control accuracy of measurements with geared rotary scale means 137 and S, as well as to provide a means to drive the rotating elements on the carriage to synchronize them with the carriage movement along the body 3. When the carriage D is moved along the body 3 from one leg to the other leg, the gear 111 changes its direction of travel by ninety degrees. When the gear 111 engages the inner edge rack 3c and the carriage D is moved to where the gear 111 reaches the intersection of the two axes of travel, the gear 111 would tend to lock when it is engaged with the racks 3c and a rack 3d simultaneously. As shown in FIG. 28, a spring 141 is positioned at the intersection of the legs 3a and 3b to allow the gear 111 to be moved and remain in geared relationship when the direction of travel is changed by ninety degrees. The spring 141 has ends that are tooth-like in shape. A limit block 142 is centered between the ends of the spring 141, preventing the inward movement of the ends of the spring 141. The limit block 142 may be held in place by a pin 143. The spring 141 is only free to flex outwardly away from the intersection. Thus, when the gear 111 engages both ends of the spring 141, one end of the spring will yield to prevent locking, while the other end maintains geared engagement which is in the direction of travel.

When the carriage D is positioned to scale and mark along the outside edge of the square C, as shown in FIG. 84, the gear 111 engages the outer edge rack portion 3e. When the carriage D is moved to where the gear 111 reaches the intersection of racks 3e and 3f at the two axes of travel, the gear 111 is kept engaged to the rack means by engaging the pivotally mounted short rack 144, as shown in FIG. 28. When the carriage D reaches the limit of travel to the center of the square C, lateral pressure against the carriage D causes the gear 111 to pressure the rack 144 which causes the rack 144 to pivot into alignment with the outer rack portion 3f. The rack 144 may be made of steel so as to cause its end that is in contact engagement to the track rack 3e to remain magnetically clamped to one of the powerful magnets 145 and 146 that are fastened to the rack portions 3e and 3f.

When power means are being used to propel the carriage D, the kicker spring 147 that is fastened to the center of the body 3 is compressed by the lateral force of the carriage just before the carriage D reaches the intersection. One of the pointed projections 82a on the lower portion of the chassis 82, shown in FIG. 27, engages the kicker spring 147. When the carriage D reaches the intersection of the legs of the square C, the force in the compressed spring 147 tends to flex the end of the spring outwardly and to kick or force the carriage D to change its direction of movement by ninety degrees and enter the track portion of the second leg. The slight carriage movement made by the carriage after it changes direction, pressures the rack 144 laterally to cause it to pivot ninety degrees until the attraction of magnet 146 causes it to remain in contact, thus providing means to allow the gear 111 to be power driven along the second leg.

The lower air-brush marker VL is shown in FIGS. 20 and 24. The marker VL is responsive to movements of the control K and the arm M that select the pivot angle index notch 89f of the selective means to make lines which contrast with each other, and the means to start and stop the marking action.

The lower marker VL has a support 148. The support 148 is fastened to the frame offset 89c with screws. A frame 149 has a boss that engages a hole in the support 148. A set screw holds the parts together. An air-brush mixing and spraying unit 150 is fastened to the frame 149. A sleeve shaft 151 engages the frame 149. A gear 152 is rotatable on the boss of the frame 149. A gear 153 is tightly keyed to the sleeve shaft 151. A fixed shaft 154 is press-fitted to the upper portion of the frame 149. The sleeve 151 is rotatable on the shaft 154. Gears 152 and 153 mesh. An arm 155 is welded to the gear 152. A hub 151a is keyed to the sleeve 151. A diaphragm turret disk 156 is pressed onto the hub 151a. The arm 155 has a finger 155a that slidably engages a hole in the frame portion 94a. An offset 157 is pivotally supported by the arm 155. A control cable 158 is supported by the offset 157. The cable 158 is like a camera shutter release cable that has a spring to cause it to yield under pressure on its plunger head 158a, and to rebound when such pressure is stopped. The head of the plunger 158a bears against an offset on the frame portion 94a. When the arm M is lowered, the frame portion 94a depresses the plunger 158a, causing the cable 158 to open a spring actuated valve on the air-brush 150, thereby causing ink marking spray 159 to flow and form lines. The air-brush 150 is shut off when the arm M is raised, by allowing the cable 158 to retract, which allows the valve on the air-brush to close. The disk 156 pivots when the arm M is pivoted, to align a selective diaphragm or opening to the nozzle of the air-brush 150. The tube 160 carries air to the air-brush. When the lower marker VL is not to be used, such as when drawing work is wanted only on the upper board 4, the offset 157 is pivoted ninety degrees, thereby disengaging the plunger 158a from the offset on the frame portion 94a.

As shown in FIG. 39, the turret disk 156 has six pivot angle zones 156a, 156b, 156c, 156d, 156e and 156f. Each zone has four different diameter diaphragm openings. Adjacent zones have a common diaphragm opening. The arm M would be selectively pivoted to notches 89f in a zone 89h that would correspond to the selected zone and diaphragm opening in the disk 156. The arm M would preferably be pivoted so that a zone 156c or 156d would be used when air-brush markers or the like are being used. The zones 156c and 156d would be used to draw along the edges 32 and 34. Zones 156a, 156b, 156e and 156f would preferably be used when drawing along the edgings 34 and 35 when a conical marker 113 is used.

An interchangeable diaphragm turret disk 161, shown in FIG. 40, may be used when a wider range of selective lines are to be drawn. The disk 161 has zones 161a, 161b and 161c, that are ninety degrees each. Each zone has seven diaphragm openings that correspond to the notches 89f in two adjoining zones 89h.

The control panel P may be mounted on the frame 89. The panel P may include switches to allow the draftsman to activate and deactivate the following electrically powered parts: motor 112, project scale light 162, illuminating light 163 and a light-beam marker. The switches on the panel P may be manipulated by the draftsman's right index finger while he is gripping the main control K.

Figure 23:
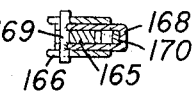
FIG. 23 is a sectional view taken along line 23—23 of FIG. 20.

The intermittent line cam means W, as shown in FIG. 20, automatically makes dashed or so-called dotted lines and other types of intermittent lines. A cam unit 164 is fastened to the shaft 95 with a set screw. The cam unit 164 may be one member or it may be formed by three cams 164a, 164b, and 164c that are coupled together. A cam follower arm 165 is mounted on the offset 89a. The arm 165 supports a follower slider frame 166. A follower wheel 167 is mounted on the slider 166. A control button plate 168 has an inverted U-shape as shown in FIG. 23. A horizontal index pin 169 is welded to the bottom tips of the button plate 168. A compressed spring 170 is trapped between the underside of the button 168 and the top of the arm 165, causing the top portion of the button 168 to be forced outwardly to an extent from the arm 165. There are four index notches 165a on the underside of the arm 165 to allow locking the index pin 169 of the slider 166 and the follower wheel 167 into selective positions to selectively engage the cams 164a, 164b, and 164c, also to engage the upper or neutral position.

When the shaft 95 rotates, the cam unit 164 rotates. The follower wheel 167 is engaged with a cam of the cam unit 164, which causes vertical reciprocal motion of the arm M to cause the markers VL and VU to spray ink onto the drawing surfaces for short intermittent periods. The duration of the spraying action of the markers onto the drawing surfaces is governed by the cam contour. Cam 164a causes the marking means to make so-called dotted lines that consist of short dashes in equal length that are uniformly spaced. Cam 164b causes the marking means to make so-called phantom lines comprising a series of long dashes with two short dashes between adjacent long dashes. Cam 164c causes the marking means to make center lines formed by a series of long dashes with a short dash between long dashes. When a draftsman changes the position of the follower 167, he depresses the control button 168 to disengage the pin 169 from one of the index notches 165a. Then while maintaining pressure on the button 168, he slides the slider 166 to another selected position and releases the pressure on the button 168 to cause the pin 169 to engage the selected notch 165a to hold the slider 166 in the selected index position. The control button 168 is closely adjacent to the main control K so as to allow the draftsman to quickly and easily manipulate the control button 168 with his right index finger while grasping the control K. The follower wheel 167 is moved to a different notched position while the arm M is in a raised position. The flexibility of resiliency of the control K allows the outer end of the control to be depressed by the draftsman while a cam forces the arm M upwardly as the follower wheel 167 maintains contact with a cam. The curvatures of the cam unit 164 are shallow so the control K is not raised to the extent that it can disengage from the switch R when the arm M rises slightly while making intermittent lines.

As shown in FIGS. 24 and 41, the thin rotary scale 137 is fastened to the top of the gear 111 with an adhesive, so the scale 137 rotates when the gear 111 rotates. The scale 137 has graduation markings for an inch or the like. The circumference of the gear 111 is a unit, such as one inch, so that one inch of movement of the carriage D causes the scale 137 to rotate once. When a long line is to be measured, the draftsman counts the number of revolutions of the marker 137 to determine the distance measured. The low cost scale 137 is highly suitable for measuring the numerous short lines that form the details of most drawings. The draftsman using the scale 137 would usually use the scales G1, G2, G3, and G4 for measuring between points when not drawing a line—also at times when drawing long lines. The scale 137 may be used to advantage to measure in either direction from any point on the square C when a non-reflective type transparent drawing surface is used and the projected scale S is not usable. The scale 137 may be removed and be interchanged with another scale such as one having graduation markings of one inch being equal to one foot. Such interchangeable scales may be made largely of thin plastic sheets that are nearly cut in half, so they can be slipped onto and off of the gear 111.

As shown in FIG. 32, the jack or switch R has a rigid center piece 171 that is fastened to the frame 89. Resilient leaves 172 and 173 are adjacent to the center piece 171. Resilient insulating leaves 174 and 175 are positioned adjacent to the leaves 172 and 173. Resilient contact leaves 176, 177, 178, and 179 have electrical contact points. Insulating leaves 180 separate the contact leaves that coact. A plastic pin or the like 181 is a non-conductor that binds the switch parts together. The draftsman makes slight selective lateral pivotal movement of the control K to the right or left before depressing it downwardly. This positioning of the control K causes the shaft 126a to engage the switch R so as to activate the motor 112 so it moves in the selected direction along the L-shaped track of the body 3. When the control K is pivoted to the left and lowered, the shaft 126a is lowered, as shown in FIG. 32. The shaft 126a acts as a wedge to bend the leaf 172 until it bends the leaves 174, and 176 to the extent that the contact points on the leaf 176 contact the contact points on the leaf 178, to complete an electrical circuit to cause the motor 112 to operate. This motor 112 is stopped by lifting the control K to cause the contacts to be broken. The motor 112 is activated to cause the carriage to move in the opposite direction by rotating the control K slightly to cause it to move to the right slightly, so it will be positioned above the leaf 173. Then the control K is depressed until it wedges between the center piece 171 and the leaf 173, causing contact between the contact points on the leaves 177 and 179, thereby completing a circuit to cause the motor 112 to operate in a reversed direction. An electric cable (not shown) is plugged into a power source to furnish power for the motor 112, and for the various lights.

The square C, with the carriage D, may be used as a compass to allow a draftsman to rapidly draw selective width lines and dotted lines to form arc and circles, particularly drawing them on the upper board 4. A pin 29 may have a hole in its bottom portion into which a conventional compass pin point 29b is inserted as indicated by the pin outline in FIG. 9. A modified one piece pin that is like pin 29, but with a compass point forming its lower extremity, may be substituted for pin 29. The pin with the compass point may be positioned on the pin arm 26 or on an end pin arm 24 or 25. A pin 29 with a compass point 29b may be inserted in a hole 26b to allow easy measuring of a radius. When a hard drawing board is used, such as a glass or steel board, a soft plastic sheet or the like may be placed on the board to allow the compass pin point 29b to grip it. The carriage D is moved so the marker VL will be positioned for starting an arc, which position will be at the selected radial distance from the compass pin point 29b. The carriage D is then locked to the selected position by depressing the lock key 184, shown in FIGS. 24, 43 and 45, so the lower portion of the key forces a brake block 185 against the gear 186. A spring 187 tends to force the key 184 to retract after finger pressure on the key has been released. A resilient catch 188 holds the key 184 down until the upper portion of the catch is sprung aside by lateral pressure of a finger. The key 184 is also depressed to lock the carriage D to a position when drawing with other compass means, template means and when drawing freehand lettering and the like.

The automatic rotary projecting scale mechanism S provides scale images on a drawing surface at a marker position without being an obstruction to drawing actions. The scale S would allow long distances to be measured easily and fully in either direction from any position on a leg of the square C. The scale S would eliminate the need to deadhead the carriage D to the zero marking at an end of a leg and it would eliminate the need to shift the square C so the zero marking on a leg is aligned with a starting point for drawing a line. As shown in FIGS. 20, 31 and 34, the scale S has a clutching arrangement with gear 191, so the scale can automatically return to a zero setting after a line is measured and the arm M is raised. The gear 191 is driven by the gear 192. A collar 193 is press fitted to the tube 105. The collar 193 restrains the gear 191 from rising. The gear 192 is keyed or otherwise fastened to the shaft 135. A threaded scale bearing 194 engages the tube 105. The tube 105 has a keyway for the key 196 on the bearing 194 so as to allow the bearing to slide vertically, but not rotate. A drum plate 195 is threadably engaged with the bearing 194 so the plate 195 can rotate. A pulley-like clutch plate 201 engages the tube 105. A curved star shaped spring 202 below the plate 201 tends to raise the plate 201. A clutch pin 203 fits a hole in the clutch plate 201. An intermediate portion of the pin 203 engages and is slidable in a hole in the drum plate 195. A spring fork 204 is supported by the arm frame 94. The fork end of the spring 204 is formed by stiffly hinged prongs 204a and 204b, which engage a groove in the upper portion of the hub of the drum plate 195. A spring 205, such as a rubber strand or a fine coiled spring, is fastened to the clutch plate 201 and to the offset 89g on the frame 89. A scale drum or cylinder 206 is a translucent strip that is banded about the scale drum plate 195 to form a cylindrical shape. The scale drum 206 may be made with a strip of photographic moving picture film whose ends are cemented together or taped together with transparent tape. The drum 206 has spiral lines of scale graduate markings 206a. They form scale band images. The illuminating projection bulb 162 projects a light beam 208 to the mirror 209 that is below it. The light beam 208 is reflected from the mirror 209 through an opening in the mask 210 and through a small portion of a scale band image on the drum 206. Then the light beam 208 passes through a lens system 211 that magnifies it, then to the surface of a mirror 212. The mirror 212 reflects the light beam 208 onto the drawing surface adjacent to the marker VL to form part of the image 208a, as shown in FIG. 38. A crossed hairs unit 213 is attached to the lens housing. The light beam 208 picks up the crossed hairs image 213 and projects it to the drawing surface where it forms part of the image 208a. The crossed hairs portion of the image acts as an orienting means by indicating the position on the drawing surface that is exactly below the center of the marker VL. The crossed hairs image allows the draftsman to orient the marker VL before lowering the arm M to start drawing action. The scale band image may have colored markings and the crossed hairs unit 213 may be a different color from those on the scale band, so as to obtain contrast from sketch lines on the drawing. A horseshoe shaped magnet 214 attached to the housing of the lens 211 is attracted to a small block of iron 215 that is attached to the drum plate 195. The magnet 214 tends to keep the zero scale setting at zero position until the carriage D is moved laterally. The magnet 214 dampens movement of the scale drum 206 when the force in the spring 205 tends to cause the scale drum 206 to return to zero position after a line is drawn. The scale S is coupled to the driving means to allow it to start measuring when the arm M is depressed to start drawing and measuring a line. The spring 204 forces the drum plate 195 and the threaded bearing 194 downwardly so the bearing 194 engages the clutch plate 201 and this action forces the plate 201 to partially flatten the lower spring 202, then to bear against the scale driving gear 191. When the scale S is so clutched and the carriage D is moved laterally, the driving gear 191 rotates the clutch plate 201. The scale finger or pin 203 transmits this rotating movement to the scale drum plate 195 which causes the scale drum 206 to rotate. The scale drum 206 moves upwardly or downwardly slightly as it rotates because of its threaded engagement with the threaded bearing 194, thus causing a spiral scale band image on the scale band drum to register through the mask opening 210. The rubber strand 205 stretches and wraps around the groove in the clutch plate 201 as scaling action takes place. When the arm M is raised the rubber strand 205 forces the drum 206 to rotate back to its original or zero position. The magnet 214 dampening the tendency of the drum 206 to oscillate before stopping at the zero position. The spiral scale band 206a can be made so that it encircles the drum 206 numerous times, thus allowing long lines to be measured. When scaling action is not wanted, such as when tracing, the draftsman spreads the fork prongs 204a and 204b which have spring washer means where they are riveted to the spring bar 204 so as to make a stiff hinge.

When the carriage D moves and the drive causes the scale drum 206 to rotate, the rotation causes the drum 206 to move towards or away from clutch 201 because of the threaded engagement between the bearing 194 and the drum plate 195. The projection light 162, mask 210, lens 211, crossed hairs 213, and mirror 212 are supported by the adjustable frame 221. A wedge 222 is moved laterally to adjust the frame 221 vertically to a selected scale band 206a. The screw 223, that dovetails into a groove in the wedge 222, is rotated to bring one of a series of scale bands on the drum 206 into registry with the mask 210. A spring 224 tends to force the frame 221 upwardly by means of the spring pressures against the underside of each of the vertical machine screws 225 and 226. The scale band images 206a are minute, as the images can be enlarged in the projection by the lens 211. When the arm M is raised, the spring 204 lifts the threaded sliding bearing 194 and raises the drum plate 195, drum 206, and allows the spring 202 to lift and thus disengage the clutch plate 201, allowing it to rotate to return the drum 206 to the zero scale position.

A draftsman views the marker VL and the drawing area adjacent to the marker VL at an angle from either side of the carriage D, thus the rotary scale mechanism S and the intermittent line mechanism W do not block the draftsman's viewing path.

The draftsman may use the magnifying lens 227 which is cemented to the marker VL. The lens 227 allows the draftsman to draw a sketch to a smaller scale. The light beam 208 passes diagonally and clear of the lens 227 so the lens does not distort the projected scale image 206a.

As shown in FIGS. 20 and 30, a slidable holddown 228 may be pushed towards the tube 102 until the beveled end of the holddown engages the collar 129 and forces the arm M to a lower position and keeps it there while drawing a very long line, or when using the drafting machine as a beam compass. The draftsman can manipulate the holddown 228 readily with his thumb to push the holddown 228 into engagement or to pull it out of engagement. The holddown 228 may have a thin resilient intermediate portion, as shown, to allow it to maintain downward pressure and to allow it to flex when making dotted lines automatically. A phantom dot-dash outline indicates the engaged position of the holddown.

As shown in FIG. 20, the illuminating light bulb 163 may be used to supplement the drawing room lighting to prevent objectionable shadows in the vicinity of the marker VL. The light 163 would have a mask or filter screen to prevent intense light from blotting out or dimming the projected scale image 208a on the drawing. A spring 229 allows the light 163 and its lower support to yield when the light 163 strikes the scale G1 or the like.

The inverted upper air-brush marker VU is shown in FIGS. 20 and 44. The marker VU is like the marker VL. A frame 234 supports the marker VU. The marker VU is used to draw lines on the underside of the upper board 4. The marker VU is responsive to movements of the control K and the arm M that select the pivot angle index notch 89f of the selective means to make lines which contrast with each other, including selective width lines and the like, and the means to activate and to stop the flow of the stream of marking spray ink 235 and the like. An inverted marker VU and the like may be used alone to mark, the lower marker VL being removed or otherwise deactivated, or the lower marker VL may be used as a tracer or follower to trace over a preliminary drawing to cause identical movements with the air-brush marker VU. A ball point pen means shown in FIG. 82, may be interchanged with the air-brush VL or the like so as to trace and mark over the white lines of a blue print on the board 1, when the lower marker or tracer does not have to make selective width lines.

The marker VU has a rigid tube 236 which is fastened with a set-screw to the arm 94. The tube 236 has a hole to fit the slidable finger 237. An offset 236a engages and depresses the plunger 238a of the control cable 238 when the arm M is lowered. The control cable 238 turns on the air-brush VU when its plunger 238a is depressed, and the air-brush VU is shut off when the arm M is raised. The control cable 238 is similar to a common camera cable release. The diaphragm turret disk 156 pivots to align a selective diaphragm or opening to the nozzle 240a of the air-brush marker unit 240.

Thus, when the arm M is depressed or lowered, the downward movement activates the air-brush marker 240 by the depressing of the control cable plunger 238a, which action opens the valve means of the air-brush 240 to cause the marking spray 235 to spray to form inked lines. When the arm M is raised, the plunger 238a springs upwardly causing the cable attached to it to retract and close the air-brush valve means.

The marker VU has a hub 242. The hub supports the diaphragm disk 156. The disk 156 is pivoted laterally with gears 243 and 244 to bring selective sized diaphragms into registry with the nozzle 240a to make selective width lines. Gear 243 is welded or otherwise fastened to an arm 245. Gear 243 engages gear 244. Gear 244 is keyed to sleeve shaft 246. A fixed shaft 247 keeps shaft 246 aligned. The disk 156 is pressed onto the hub 242.

An interchangeable disk 161 may be used instead of the disk 156, as was described for the marker VL. Tube means 248 carries air to the air-brush portion 240. When an upper marker VU and the like is to be inactive for a long period, the support 250 is loosened by turning its nut 250a and then pivoting the support ninety degrees.

As shown in FIGS. 20 and 34, the carriage D has means to divert the light beam 208 that carries the projected scale image and the crossed hairs image so that it can be projected onto a coated drawing surface on the underside of the upper board 4 for use when the draftsman watches the sketching on the upper board 4 through the board 4 when the board is translucent or when he watches reflections of the lower surface of board 4 that reflect from a mirror type surface on or adjacent to the lower board 1. A round nut is loosened to allow the mirror 212 to be pivoted to the position indicated by the dot-dash outline 212a to allow the light beam 208 to carry the images to the upper board 4. The mirror 212 reflects the images to a higher mirror 251 which reflects the images to the upper board 4 at the center of the vertical axis of the spray of ink 235.

When a highly skilled and accurate draftsman is to trace a preliminary drawing on the board 1 to cause the upper marker to make a fine final patent drawing or the like on the upper board 4, a light-beam marker VB may be used instead of the air-brush marker VU, to allow such a drawing to be made faster and with better delineation, by eliminating such time as would be required to replenish ink and time to frequently clean the air-brush. An air-brush nozzle tends to accumulate a coating of ink that partially clogs it, thereby causing inaccuracies in the width of lines being made. An upper light-beam marker VB in combination with a lower pencil marker 113 or a ball pen marker 252 such as the pen shown in FIG. 82, would be highly useful when air-brush markers could not be used because of the health hazard of inadequate ventilation means to collect excess spray of the air-brush means.

The light-beam marker VB is shown in FIG. 56. The light-beam marker VB may be interchangeable with the air-brush marker VU, since the support means and the control means to make lines that contrast with each other, particularly lines that have selective width, is largely the same for the air-brush VU and the light-beam marker VB. The board 4 may have a photo-sensitized sheet 254 attached to its upper or lower surface, or a surface of the bord 4 may be coated with a photo-sensitized solution. The light-beam marker VB has a light unit 255, an electric cable 256 that is connected to a power source and to the control panel P. The light unit 255 has a small electric light bulb 257, which may have a condensing lens (not shown) to concentrate the light. The control cable 238 is attached to a switch in the light unit 255. When the control K is lowered, the control cable 238 would turn on the switch and cause the light bulb 257 to produce a light-beam 258. The different sized holes or diaphragms in the turret disk 156 or the like would regulate the diameter of the light-beam 258 that is projected onto a coating on the board 4. An opaque sheet 259 may be clamped to a translucent board 4 with resilient curved edging 260 as shown in FIG. 56, to keep out stray light from above. A highly elastic opaque sheet 261 may be clamped to the underside of the board 4 with resilient curved edging 262. An opaque rigid shield or screen 263 confines the disk 156 to prevent stray light from passing through the disk 156 and the hub 242. The shield 263 is secured to the disk 156 with a resilient wire ring 264. The shield 263 is secured to the light unit 255 with a setscrew. The shield 263 has a hole that is aligned with the light beam 258. The disk 156 rotates within the shield 263. The elastic screen 261 is attached to the shield 263. When the light-beam marker VB is to be inactive for a long period, the support 250 may be loosened and rotated ninety degrees to deactivate the marker, or the power for the bulb 257 may be switched off at the control panel P.

The light-beam marker VB would allow the making of lines on sensitized sheet or coating that would be equal to inked lines for making reproductions. The sensitized sheet may be coated with silver photographic solution or the like. The sensitized coatings may be the type usable for xerography processing, wherein the light-beam 258 changes the polarity of carbon coated areas that it strikes, to form the reproduction image. Such carbon covered area may be above the board 4, with suitable means to fix the image.

The light-beam marker VB would be most useful when a lower marker VL or the like is used to trace over the white lines of a blueprint of a preliminary drawing on the board 1, while the light-beam marker VB clearly marks the sensitized sheet or coating. With such usage, the marker VL or the like acts primarily as a guiding element to follow the sketch lines and to mark off the lines on the blueprint as they are traced.

Fine multi-color lined engineering drawings can be made easily and quickly with the light-beam marker VB projecting different colors onto a color sensitized photographic sheet. Lines that differ in color are lines that contrast with each other effectively. A disk 156 may be used for color work such as by fastening a thin red filter over the zone 156a, green filter over the zone 156f, and a dark blue filter over the zones 156c and 156d. The arm M may be selectively pivoted to cause the marker VB to make four different width lines of each of the three colors. The marker VB can be used most effectively to make multi-color lined drawings by using a color turret disk 268 or a color turret disk 269. The disk 268 has color zones 268a, 268b, 268c, 268d, 268e, and 268f. Each zone is covered with a different colored filter. The disk 269 has color zones 269a, 269b and 269c, each of which is also covered with a different colored filter. Disks 268 and 269 do not have a common diaphragm opening for adjoining zones. The two outer notches of each group of notches 89f are used in conjunction with disks 268 and 269. Each zone of the disk 268 has four different sized diaphragm openings. Each zone of the disk 269 has seven different sized openings. The marker VB can thus be used to draw lines that contrast wtih each other by being different in width, by being different in color, or by being different both in width and color. When such colored drawing work is being made with the upper marker VB, the lower marker may be ball point pen 252 as shown in FIG. 82. Interchangeable ball point pens that vary in color and width may be inserted as needed.

When facilities are not available or not adequate for handling a large sensitized photographic sheet 254 that is attached to the lower or upper surface of the upper board 4 as shown in FIG. 56, or when large sensitized sheets of paper or film, particularly color sheets, are too costly for the contemplated usage, the light-beam 258 may be projected onto a frosted-glass-like coating that may be made on the lower or upper surface of the board 4 and then be copied with a camera 271, as shown in FIG. 59. A photo-sensitized sheet in the camera 271 is part of the drawing surface means. The camera 271 may be mounted on a support 272 that is above the board 4. The shutter of the camera 271 is opened when the light-beam VB is being used, so as to record the light pattern formed by the light-beam 258. A bellows or light-proof screening 273 may be used as shielding from stray light. The bellows 273 may be clamped to the board 4 with resilient curved edging 274 to keep out stray light. The opaque sheet 259 would be removed from the board 4 before the bellows 273 is attached. The camera 271 may be the type that uses 35 mm. film, including color film and microfilm.

Many engineering fields require the making of pencil drawings or the like, particularly the making of drawings with plastic leads on "Mylar" drafting film. FIGS. 20 and 72–76 show the means to use the conical tipped pencil lead marker 113 or the like, instead of the marker VL. The control K is depressed to lower the arm M, which causes the conical marker 113 to bear against the drawing surface on the board 1. There are means to cause the marker 113 to rotate. The marker 113 is offset from the edging 32, therefore the marker cannot grind against the edging. The marker 113 may be made of graphite or plastic lead and the like. A conical shaped porous metal marker that releases ink through the conical surface may be used for ink type drawings. Such a porous marker is described in detail in my Patent No. 3,020,640. My Patents No. 2,701,417 and No. 3,020,640 describe rotating tilted conical tipped markers thoroughly, also other markers suitable for use with the carriage D.

The marker 113 is gripped by a mechanical pencil holder 280. Bearings 281 and 282 allow the pencil holder 280 to be rotated within the sleeve portion 94a. The marker 113 may be made to rotate by rotation of the gear 111 to which it is interconnected. The beveled gear 283 is soldered or otherwise fastened to the shaft 95. The gear 283 drives the beveled gear 284. The gear 284 is keyed or splined to the holder 280. A removable cap 285 is fastened with a bayonet fitting or the like to the top portion of the sleeve portion 94a. The cap 285 restrains the holder 280 from moving upwardly out of position and it can be removed to allow the holder 280 to be removed. The holder 280 has an extension 286 which may be gripped and be turned to advance or project the marker 113 further when the tip of the marker 113 wears away to an extent. The lower portion of the holder 280 may be gripped through the opening 94c in the sleeve portion 94a when turning the extension 286. The marker 113 is constantly rotated while drawing, to dress the conical tip that is made of pencil graphite and the like. The porous marker (not shown) is rotated to wipe ink off the conical surface to cause the ink to form lines.

The selective pivoting of the arm M causes the line of contact 113a of the conical surface of the marker 113 to be selectively skewed in relation to the direction at which it travels to make a line. When the arm M is pivoted so the horizontal axis of the arm M and the marker 113 form a pivot angle of ninety degrees from the path along which a line is to be drawn, the maximum width line is drawn. When the pivot angle is zero, the narrowest type of line is drawn. The zones 89h that provide maximum pivot angles of forty-five degrees are shown, as they would be most useful for the present machine. When a marker 113 is about one-sixteenth of an inch in diameter, a pivot angle of forty-five degrees is sufficient to make the widest lines needed for most types of drawings.

The draftsman can turn the extension knob 286 while restraining the gear 284 from rotating, to manually feed a pencil lead type marker 113 or the like. The marker 113 may be fed automatically with feeding means. The gear means that causes the dressing action, causes the feeder to act. A rocker 290 coacts with a ratchet wheel-like portion 280a of the holder 280. The holder 280 has an eccentric portion 280b. The holder 280 has a conventional mechanical pencil friction clutch between the conventional upper and lower portions. A spring 291 tends to raise the long arm of the rocker 290. When a pencil marker 113 wears down to an objectionable degree, the arm M depresses further and the short end of the rocker 290 engages the offset 89b, causing the rocker to pivot, thus depressing the long end of the rocker 290 until its pawl engages the ratchet 280a. A limit stop 292 limits the movement of the rocker 290. The rocker 290 bears against the ratchet 280a until the geared drive turns the gear 284 and the lower portion of the holder 280 until the eccentric 280b bearing against the lower outer tip of the rocker 290 forces the rocker away from the ratchet 280a, thus causing a short feeding action that feeds the marker 113 from the holder 280. This feeding action only works during the counter-clockwise rotation of the holder 280. When the rocker 290 pivots towards the ratchet 280a when the holder is revolving clockwise, the pawl will not engage the ratchet 280a securely and the force would tend to bend the thin spring-like portion of the rocker 290 to thus prevent a binding action of the rocker to the ratchet.

As shown in FIGURES 20 and 46, the swivel arm D2 includes means that allows the marking means to move laterally away from the carriage chassis 82. The swivel arm D2 is similar to a conventional band and pulley type of parallel motion mechanism of a drafting machine, such as the mechanism described in Patent No. 2,331,332. An older type of swivel arm such as a hinged parallel motion arm, like that shown in my Patent No. 3,120,060, may be used instead of the band and pulley-sprocket type.

The swivel arm D2 is supported by a strong tubular mast 298. The mast 298 is securely fastened to a boss or offset on the chassis 82, by welding or other suitable means. A double sprocket 299 is rotatable on the lower portion of the mast 298. A collar 300 is fixed above the sprocket 299, so as to take the load of the swivel arm D2, to allow the sprocket to rotate readily. A swivel arm part 301 pivotally engages the mast 298. A sprocket 302 is fixed with a setscrew 303 to the mast 298 so that the sprocket cannot rotate. Another swivel arm part 304 is pivotally engaged with the arm part 301 with pins 310 and 311. The upper portion of the arm part 304 is pivotally engaged with the upper portion of the head frame 89 with a fixed pin 312, that is secured to the head frame with a set screw 313, so the sprocket 314 cannot rotate. The sprocket 314 is pressed-fitted to the pin 312. The arm part 304 is pivotally engaged to the bracket 140 with a pin 319. A double sprocket 320 rotates on the pin 310. A double sprocket 321 is press-fitted to the pin 311. A gear 322 and a sprocket 323 are rotatable on the pin 319. A washer 324 and an eccentric 325 restrains the sprocket 323 from disengaging from the pin 319. The washer 324 bears against the underside of the sprocket 323. The eccentric 325 is pin connected to a yoke in the bottom of the pin 319. The sprocket 323 and the gear 322 are tightly clutched together to cause them to coact, when the eccentric 325 is pivoted to raise the sprocket 323 to force the sprocket tightly against the gear 322.

The contacting clutch surfaces of the gear and sprocket may have radial grooves to cause the parts to interlock to form a positive non-slipping driving means. A small spring in a recess in a clutch surface causes the clutch surfaces to separate when the eccentric 325 is pivoted upwardly to lower the sprocket 323 slightly. A perforated band 330 engages the sprockets 299 and 320. A perforated band 331 engages the sprockets 320 and 323. The bands may be made of metal or strong plastic, similar to perforated moving picture film. A perforated band 332 engages the sprockets 302 and 321. A perforated band 333 engages the sprockets 314 and 321. The arm parts 301 and 304 are free to pivot laterally to allow the marking means to sweep across the drawing surfaces. The sprockets 302, 314 and 321 have identical diameters. The bands 332 and 333 coact with the sprockets 302, 314 and 321 to cause the frame 89 to remain in a constant angular relationship with the chassis 82, as the head D1 sweeps the marking means over the drawing surfaces.

The swivel arm D2 includes interconnecting drive means that couples the gear 322 on the head D1 with the gear 111 on the chassis 82. As shown in FIG. 29, an idler gear 336 engages gears 322 and 136. As shown in FIGS. 20, 24 and 45, a perforated band 337 engages sprockets 299 and 338. Sprocket 338 is keyed to a pin 339. The pin 339 is rotatable in a hole in the chassis 82. A gear 340 shown in FIG. 42, is keyed or tightly pressed to the lower portion of the pin 339. An idler gear 341 engages gears 340 and 111. A pulley or sprocket 345 bends the band 337 away from the hand-rest 85.

The eccentric 325 would be used to disengage the clutching of the gear 322 and the sprocket 323 when drawing free hand lettering or the like, to reduce the drag of moving the head D1. The gear 322 and sprocket 323 would also be declutched when the machine is to be used to draw curved or transverse dotted or other types of intermittent lines, and the motor 112 is to be used to power the automatic intermittent line means, in addition, declutching action is made before using a pencil lead marker 113 to draw free hand lettering and the like with the motor 112 furnishing the power to rotate and feed the lead.

When the swivel arm D2 is extended, the weight of the arm D2 and the weight of the head D1 has a tendency to tilt the carriage chassis 82. Such tilting would tend to bind the chassis 82 to the track portion of the body 3, and the tilting would cause the upper marker VU to deviate out of true alignment with the lower marker VL. An upper L-shaped square 346 is used to prevent such tilting. The square 346 is used to prevent such tilting. The square 346 is shown in FIGS. 7, 8, 11, 20, 21 and 55. The square 346 is supported at its ends by two rigid tight fitting diaphragms or supports 347, that have interlocking engagement with the square body 3 and the square 346. The square 346 is similar to the body 3. A strong stiff shaft 348 projects through the mast 298. The shaft 348 is rotatable in bearings at the extremities of the mast 298. The gear 186 is keyed to the bottom of the shaft 348, and a gear 349 is keyed to the top of the shaft. The gear 186 engages the rack 3e on the lower square body 3 and the gear 349 engages a rack portion on the upper square 346. A pin 350 is supported by an arm 351. The arm 351 is keyed with a set screw to the mast 298. The pin 350 engages a continuous slot in the upper square 346, to restrain the gear 349 from disengaging from the rack portion. A wheel 352 that is adjacent to the gear 349, engages the track of the square 346 to maintain tooth clearance.

A coupling means, as shown in FIG. 48, may be used to by-pass much of the interconnecting drive between the gear 111 and the gear 322, to allow extreme accuracy in measuring straight lines with the scale S, while drawing straight lines without extending the swivel arm D2. A sliding sleeve 353 has an octagon shaped hole. The sleeve 353 engages the octagon shaped exterior of the upper portion of the sprocket 338. The upper portion of the sleeve 353 has two fingers that are engagable with the two sockets in the bottom of the sprocket 323. The fingers and the sockets may have magnetic means or other adhering means to hold the sleeve 353 to the sprocket 323.

The selector N, shown in FIGS. 20 and 49, allows selective indexing to allow desirable lateral movements and non-movement of the head D1 with respect to the chassis 82. The selector N may be selectively indexed to allow the head D1 to be variously moved, including indexing to allow drawing action close to the edging 32 and the like; indexing to sliding guide bars 360 and 361 (as shown in FIG. 60), to allow the head D1 to move away from the chassis 82, to enable the drawing of lines at right angles to the edging 32 and the like, also the drawing of parallel lines that are far out from edgings. In addition, the indexing may be used in a neutral position to allow free hand and template guided characters to be drawn. The selector indexing also includes means to allow small circles and arcs to be drawn easily without a template, and without moving the body 3.

As shown in FIGS. 41, 49–54 and 80, a selector pin 362 is engaged to a selector shaft or plunger 363. The pin has a vertical point and a long threaded horizontal stem that allows the pin point to be offset from the shaft 363. A knurled nut 364 engages the pin 362. The pin 362 has a flattened key-like bottom portion that engages a flat portion in a hole on the shaft 363, to prevent the pin from rotating. The pin 362 is selectively pivoted to engage the sockets 360a and 361a in the guide bars 360 and 361, a socket 82b in the chassis 82 and a socket in the top of the pin 365. The socket 82b is used for maintaining the marker VL close to the edging 32 and the like. FIG. 41 shows the pin 362 engaging the socket 82b. The shaft 363 slides vertically in a hole that is in a boss portion 89n of the frame 89. A ball chain 368 is attached to the top of the shaft 363, which allows the shaft to be raised. The shaft 363 has a broad circular head. A guide tube 369 is soldered to the frame 89 to restrain the shaft 363 from tilting. A spring 370 bears downwardly on the head of the shaft 363, tending to force the shaft 363 downwardly. When the shaft 363 is being kept in a raised position, it is restrained from moving downwardly by anchorage of the ball chain 368 to a pivotally mounted yoke control key 371, as shown in FIGS. 50 and 51. The yoke 371 is fastened to a pivotable collar 372. The collar 372 is mounted on the boss 89n. The outer end of the yoke 371 may be forced downwardly by a draftman's finger to cause the ball-chain 368 to raise the shaft 363 to retract the pin 362 from the socket 82b, as shown in FIG. 52. The draftsman may hold the yoke 371 down while he moves the head D1 laterally away from the chassis 82 to position the markers VL and VU for drawing free hand characters. When the pin 362 has moved outwardly past the edge of the chassis 82, the draftsman releases the pressure on the yoke 371. Instead of hand pressuring the yoke 371 to retract the pin 362, the draftsman may raise the control K to a high degree to cause a spring 373 to raise the shaft 363. The spring 373 is hooked onto the control shaft 126a and onto the ball chain 368. When the selector N is indexed into the guide bar 360 or the guide bar 361, the yoke 371 is depressed and selectively pivoted laterally to allow the pin 262 to engage the selected socket.

As shown in FIG. 50, the yoke 371 is selectively engageable with any of the three notches 89p in the frame 89, to maintain the pin 362 in an index position. The collar 372 has a segment cut-out which allows the tip of a machine screw 376 to engage the shaft 363. The tip of the screw 376 is pointed so it can act as a key to engage a narrow keyway in the shaft 363. The shaft 363 may be positioned as shown in FIG. 68 to allow the pin 362 to engage recessed characters in a conventional template 377. The ball chain 368 is disengaged from the yoke 371 and the spring 373, allowing the spring 370 to force the shaft 363 downwardly. Then the ball chain 368 is re-engaged to the yoke 371 and to the spring 373. The shaft 363 may be raised enough to disengage the pin 362 from the template 377 by depressing the yoke 371 or by raising the control K to a high degree. Since it is desirable to index into a template before starting marking action, the spring 373 allows the control K to be lowered to an extent so the pin 362 may engage the template 377 without starting drawing actions. The shaft 363 may be tubular so as to hold a needle tracer 378. A spring clip 379 restrains the needle 378 from falling down. The clip 379 is shown in detail in FIG. 53 and in position in FIG. 49. The upper portion of the clip 379 engages the shaft 363, and the lower portion of the clip engages a circular groove in the needle 378, or the lower portion of the needle. Circular grooves in the needle are clearly shown in FIG. 54. The needle 378 would allow the marker VL to work closer to the body 3 than would the pin 362. The needle 378 has other uses which will be described further on.

As shown in FIGS. 24, 25, 41 and 60, the slider guide bars 360 and 361 slide in dovetailed grooves in the chassis 82. The guide bars are at right angles to each other, so that guide 360 can be used to guide the marking means to allow lines to be drawn adjacent edging 32 and the guide 361 can be used to draw adjacent to the edging 34. The guides 360 and 361 guide the marking means to allow short transverse lines to be drawn at right angles to intermediate portions of an edge of the square C. In addition, the guides 360 and 361 maintain the marking means in selective positions away from the square edging, to allow a plurality of lines to be drawn parallel to an edge of the square C, without shifting the square. The guides 360 and 361 allow both transverse and parallel lines to be drawn beyond a template that is attached to the scale G1 or the like.

The selector pin 362 is indexed to a hole in the guide 360. Then the control K is moved laterally to cause the marker VL to move away from the adjacent edge of the body 3 to a position such as the position shown in FIG. 60. The marker VL and the like may be controlled so as to draw a line as it moves away from the body 3, or the pivot arm M may be kept raised as the marker moves outwardly, until the marker VL reaches a position for starting a line that is to be drawn parallel to the adjacent edge of the square.

Interchangeable scales 381 and 382 may be fastened to the guides 360 and 361. The scales may be fastened with adhesives that allow them to be attached and to be removed readily. When many short intermediate lines are to be drawn out from an edging, the selector pin 362 may be selectively indexed to a guide, and be kept in that position until there is need to index to the other guide. An arrow marking at each such scale allows the distance to be measured from the adjacent edging to the marker VL. Each of the guides 360 and 361 has a stop or brake means for locking it into any extended or non-extended position. Each stop means includes a brake block 384 that is slidable in a slot. The block 384 is forced to bear against a guide 360 or 361 by a cable control 385 or 386. Each cable is activated by depressing a key 387. FIG. 33 shows details at the key 387. Each key 387 is kept in a locked position after it is depressed, by a spring catch 388. A catch 388 is pressured laterally to release a key. A spring 389 helps to cause the key 387 to retract. The bottom of the key 387 bears against a sloping end portion of the plunger of the cable 385 or the like.

When the guide bars 360 and 361 are being used to draw short lines at right angles to the edgings, the chassis 82 is restrained from moving while drawing. The chassis 82 may be restrained by the draftsman's hand pressing against both the hand-rest 85 and the body 3, or by depressing the lock key 184 which restrains the chassis from moving.

Since the drafting machine has a low air-brush VL that allows selective uniform width lines to be drawn in any direction with one setting of the marking means, it coacts with a wide scope of template guides and the like, to allow a great range of characters to be drawn rapidly, particularly lettering of selective line width, selective size, and selective slope. The drafting machine can coact with the hundreds of templates that are readily available, including conventional perforated character templates, recessed character templates and conventional raised irregular curve templates and the like. As shown in FIGS. 7, 64, 65 and 66, a conventional lettering template 377 can be attached to an edge 32 and the like, to keep the template in alignment with the edge 32 and to allow the template to be moved when the square C is moved. Lettering template 377 may be maintained in attached and slidable engagement with an edge of the square while drawing parallel or transverse lines out from the edge and beyond the template. The gap between the body 3 and the board 1, allows lettering template 377 and the like to slide partially below intersecting portion of the body 3. The conventional lettering template 377 has recessed template characters. The template 377 is shown in FIG. 66, with the selector pin 362 engaging the template. FIG. 61 shows an adjustable scriber SC engaging the template 377.

The template 377 is shown positioned in a channel or groove on a template holder 391. The holder 391 may be made of plastic or metal. The holder 391 is clamped to the scale assembly G1 or the like, with resilient wire clips 392 and 393 as shown in FIG. 64. The clip 392 grips the beveled adjacent edge of the scale G1 and the clip 393 grips the other edge of the scale G1. The holder 391 may be kept in a given position, while a group of letters are made. The template 377 is slid back and forth to bring selective characters into position. The holder 391 keeps the template 377 in alignment with the square, in addition, the holder 391 keeps the template 377 raised, therefore unlike conventional use of such templates that slide on and smear a drawing surface, the template 377 cannot rub and smear the drawing surface on board 1.

When the template 377 is to be used as shown in FIGS. 66 and 68, the selector pin 362 is moved to position it above a template character. Then the control K is manipulated downwardly to an extent so the pin 362 securely engages a recessed template character. Then the control K is farther depressed downwardly to cause the markers VL and VU or the like to be activated. The control K is raised high to cause the spring 373 to raise the pin 362 to an extent.

When the needle 378 is used to engage the template 377, as shown in FIGS. 77 and 79, the control action would be like the action to use the pin 362.

The scriber SC, shown in FIG. 61, is like the scriber described in Patent No. 2,686,971. The scriber SC has adjustable means to allow a single template 377 or the like, to be used to make lettering of selective height without varying the width of the letters and to make the lettering vertical or selective in slope. The means shown in FIG. 61 is an improvement over the teachings of Patent No. 2,686,971, since the pantograph means of swivel arm D2 can be used to selectively enlarge or reduce letters in their entireties, unlike the selective varying of only the height of letters with the scriber alone.

The scriber SC has a body or frame 396. The frame 396 has a pin 397 attached to the tail end. The pin 397 engages a conventional groove in the template 377. An arm 398 is fastened to the frame 396 with a bolt 399. The bolt 399 has a head and a nut. The arm 398 has a tracer pin 400 attached to it. An elevating screw 401 supports the head end of the frame 396. The screw 401 has a head and a lock nut to adjust the elevation of the frame 396. The frame 396 has a gripping portion that has a rubber sleeve 402 that is squeezed to grip the needle 378, as shown in FIG. 62. A screw 403 is tightened so the needle 378 is gripped securely. The sleeve 402 yields to allow the frame 396 to tilt when the arm M is raised. The tilting action retracts the needle 378 from the template character recess. The frame 396 has a slot and the arm 398 has a slot, through which the bolt 399 projects and holds the frame 396 and the arm 398 tightly together. The arm 398 and the frame 396 are selectively adjusted by variously positioning each other before tightening the bolt 399.

The selective adjusting allows one template 377 or the like, to be used to draw letters of selective height and of selective slope and the markers VL and VU allow the letters to be made selective in width of lines.

As shown in FIGS. 22, 46, 47 and 69, the swivel arm D2 includes pantograph means to allow template patterns to be selectively enlarged or reduced thereby eliminating the need for numerous templates. Bars 408 and 409 are pivotally joined with a tubular pin 410. Long headed machine screws 411, join the bars 408 and 409 to the arm parts 301 and 304. The arms 301 and 304 have spaced tapped holes 301a and 304a to suit screws 411. The holes are spaced to suit selective sizing of the enlarging and reducing means. The bars 408 and 409 have slots 408a and 409a that have spaced notches 408b and 409b to fit a shouldered portion of a screw 411. The notches 408b and 409b are spaced to suit selective sizing of the enlarging and reducing means. Each screw 411 projects through a hole in a U-shaped plate 412. Flanges on a plate 412 prevent a bar 408 or 409 from spreading in width. The selective sizing of the pantograph is made by disengaging the screws 411 and by lowering them so the wide shouldered shank is below the bar 408 or 409. Then by moving the parts so the selective notches 408b and 409b the selective tapped holes 301a and 304a are aligned. Then the screws 411 are engaged with the selected holes.

Figure 22:
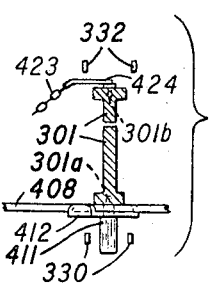
FIG. 22 is a fragmentary, sectional elevation taken along line 22—22 of FIG. 46.
Figure 21:
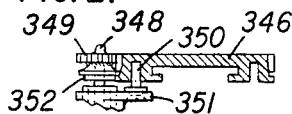
FIG. 21 is an enlarged, fragmentary, sectional elevation taken along line 21—21 of FIG. 7.

The tracer means 415 shown in FIG. 69, is kept in a retracted position 415a when the pantograph means is not being used. The tracer 415 is pivoted down and locked into an operable position with a set screw. The tracer 415 may have interchangeable points 416. A needle point may be used to trace patterns in templates and the like, or a small ball point pen may be used, such as the pen 252 shown in FIG. 82. The ball pen would be useful to mark out blueprint lines as they are traced. A ball pen in the tracer 415, may also be used to mark a drawing when a reduction in size of a template character is made. Since it is most desirable to engage a tracer to a template before starting the ink flow of a marker, the tracer 415 may be raised by depressing the key 418, as shown in FIGS. 69 and 70. A spring 419 tends to force the key 418 upwardly. A resilient catch 420 has an offset that restrains the key 418 from rising until the draftsman pressures the catch laterally to allow the key to rise. As shown in FIGS. 22 and 69, a chain 423 may be used to prevent sagging of the heavy center portion of the pantograph means. A pin 424 engages the chain 423 and a selective hole 301b in the top of the arm part 301.

Since many draftsmen in making a final patent drawing and the like, prefer to trace all of the numbers and letters before or after making all of the sketch structure lines, there are means shown in FIG. 71, to greatly increase the range of the pantograph means by allowing more lateral movement of the tracer point 415. An upper square support 347 is removed, the set screw 303 on the mast 298 is loosened and the swivel arm D2 is swung one hundred and eighty degrees, the carriage D is removed, rotated one hundred and eighty degrees, then the carriage is reengaged to the track portion of the square and then the screw 303 is retightened and the support 347 is replaced. Additional latitude for using the pantograph means is made by removing an edging 32 and the scale G1, as shown in FIG. 79, to allow tracing means to be used closer to the body 3.

When the contemplated usage for a machine does not include the need for a pantograph means, the swivel arm D2 may be made much shorter. The shorter swivel arm would reduce the amount of torsion in the arm, thus allowing more accurate drawing work, particularly the drawing work on the upper board 4. Since distortion of the arm D2 would tend to cause slight inaccuracies on the drawing that is on the upper board 4, intricate patent drawings and the like can be drawn to double size, then the inaccuracies would be halved by making a lithograph to half the size of the original drawing.

As shown in FIG. 67, a template-like guide frame 431 may be positioned in the holder 391, to provide guide lines for free hand lettering. The guide 431 includes resilient rubber strands that are held in a selective position by grooves and slots. The control K is moved to cause the needle 378 to engage the guide 431, then the control K is moved to form lettering patterns which causes the needle 378 to make lettering. The rubber strands stretch to allow fractions and the like to be drawn. An underlay below the guide 431 is marked with the needle 378. The underlay includes a white translucent plastic sheet 433 and below it a stiff carbon-like sheet 434. Pressure of the point of the needle 378 against the plastic sheet 433 and carbon sheet 434, causes the carbon to adhere to the plastic sheet, thus recording the lettering pattern that has been made with the air-brush markers or the like. The guide 431 and the sheet 433 are hinged to the carbon sheet 434. The guide 431 and the sheet 433 are pivoted upwardly to erase the lettering on the sheet 433.

As shown in FIG. 78, the scriber SC that has a conventional scriber pen 436 attached to it, may be coupled to the arm M. A non-rotating shaft 437 is fastened to the sleeve 94a. The shaft 437, may be fastened with a set screw such as the set screw 438 shown in FIG. 82. The shaft 437 has a threaded portion that is loosely bolted to the scriber frame 396. The shaft 437 has a thin resilient portion that can bend to allow the scriber to tilt when the arm M is raised to disengage the scriber tracer from a template character.

As shown in FIG. 81, a guide bar 360 or the like can coact with the selector N to allow small circles and arcs to be drawn without template means and without a compass pin touching a drawing surface. The guide bar 360 is locked into an extended position, then the pin 362 is inserted in the socket in the bar 360. The knurled nut 364 is rotated to cause the pin 362 to move laterally until the distance from the center of the pin 362 to the center of the needle 378 is equal to the radius of the circle to be drawn. The screw 376 is rotated to retract its tip from the keyway in the shaft 363. The marker VL is positioned where the circular line is to be started, then the control K is moved in a circular path that causes the head D1 to rotate about the pin 362, thus the markers VL and VU draw circles.

FIG. 82 shows a holder 441 that allows a ball point pen 252 to be used on the arm M. The holder 441 is securely attached to the sleeve 94a with a set screw 438. The ball point pen 252 would be most useful when tracing over the white lines of a blue print on the board 1 while the upper marker VU draws fine ink lines.

The square C may be attached directly to the protractor-carriage 6, as shown in FIG. 83. A T-square 2b or the like may be used to quickly and accurately aid in tilting or skewing the square. The T-square 2b may be slid aside after a conventional protractor setting lock on the carriage 6 is locked to maintain the square C in a selected tilted position.

The square C may be used without the T-square 2b, the index arm E and the pin arms, by using only the protractor on the carriage 6, the carriage D can be used to mark along the full lengths of both the inside and the outside of the square.

The square C may also be attached as shown in FIG. 84 to allow the carriage D to be used to measure and mark along the full lengths of both the inside and the outside of the square.

The center of the square C may be attached to the carriage 6 as shown in FIG. 85, by using the socket holes that were described for use to allow a pin arm 26 to be attached. The mounting of the square C as shown in FIG. 85 reduces the amount of deflection of the square C when the square C is raised when moving it over the board 1, when the board 4 is removed.

While I have shown an L-shaped square C with a carriage D, a modified but less useful machine may be made by eliminating the leg 3a, thus having the single leg 3b with the carriage D mounted on it. The leg 3b may be used to draw lines at right angles to each other by pivoting the leg ninety degrees with the aid of the track means B or the like.

Since the engineering draftsmen and others who could use the present invention, work in fields that differ in scope, it is obvious that all the elements shown in the drafting machine would not be needed by all the users. There are obviously many useful sub-combinations of the elements shown; particularly sub-combinations without motor, rotary scale, spacer means, and inverted marking means.

Although, I have shown gear means for driving rotating parts, plain friction wheel means such as those shown in my Patent No. 3,256,607 may be used instead of gears to provide a machine that would be limited in accuracy.

Power means (not shown) may be used to raise and lower the pivot arm. The power means may be similar to such power means shown in my Patent No. 2,701,417.

Servo-motor means and synchro-motor means (not shown) may be incorporated into the drafting machine to allow drawing at a remote distance from a drawing or the recording on tape of drawing operations, to allow the tape to operate the machine when needed. The drafting machine may also be programmed by a computer in a manner well known in the art to obtain a predetermined sequence of operations.

While I have illustrated and described certain specific embodiments of my invention, it will be understood that these are by way of illustration only and that various changes and modifications will be readily suggested to those skilled in the art after having had the benefit of the teachings of the present specification.

I claim:

1. A drafting machine comprising an L-shaped square means, said L-shaped square means including two legs, said L-shaped square means having an L-shaped track means, said L-shaped track means being formed by intersecting straight track portions, a carriage means mounted on said L-shaped track means, said carriage means being a single carriage, said carriage means including a chassis, said carriage means including a swivel arm, said swivel arm including a link having one end pivotally connected to said chassis, said swivel arm including a second link having one end pivotally connected to the other end of said first mentioned link, said carriage means including a head means connected to the other end of said second link, a marking means mounted on said head means, control means mounted on said carriage means, said marking means being responsive to said control means, whereby said marking means can sweep over a large drawing surface while said L-shaped square means is stationary.

2. A drafting machine as recited in claim 1 wherein said marking means includes selective means to make lines which contrast with each other, whereby a fine delineation covering a large area can be made rapidly with ease.

3. A drafting machine as recited in claim 1 wherein said marking means includes means to make lines of selective width, whereby large clearly readable sketch portions can be made easily.

4. A drafting machine as recited in claim 1 wherein said swivel arm includes pantograph means, whereby template characters may be enlarged and be reduced.

5. A drafting machine as recited in claim 1 wherein said L-shaped square means is two L-shaped squares in spaced relationship, whereby said swivel arm is restrained from tilting, and whereby said carriage means is easily moved.

6. A drafting machine as recited in claim 1 wherein said carriage means includes wheel means engaged with said L-shaped track means, said carriage means including motor means interconnecting with said wheel means, whereby said carriage means can be moved along said L-shaped track means.

7. A drafting machine as recited in claim 1 wherein said marking means includes a marking element having a substantially conical tip rotatable about its own axis and being supported at an acute angle with respect to a drawing surface, so as to provide line bearing contact therewith along the entire length of the conical surface of said tip, said carriage means including means to cause said marking element to rotate, said marking element being pivotable laterally in response to said control means, whereby lines of selective width can be drawn rapidly.

8. A drafting machine as recited in claim 3, wherein said carriage means includes transverse drawing means responsive to said control means to draw a short line at right angles to an intermediate portion of one of said legs while said L-shaped square means remains in a set position, whereby numerous short extension lines and center lines can be drawn with little motion and effort.

9. A drafting machine as recited in claim 3 wherein said carriage means includes means to draw a plurality of lines parallel to each other and in parallel relationship with the longitudinal axis of the adjacent one of said legs while said L-shaped square means remains in a set position, whereby little motion and little effort is required to draw numerous lines.

10. A drafting machine as recited in claim 3 together with means to automatically draw intermittent lines in response to said control means, whereby fine uniform hidden and phantom lines can be drawn rapidly and easily.

11. A drafting machine as recited in claim 3 together with scale means mounted on said head means, and wherein said carriage means includes wheel means engaged with said L-shaped track means, and wherein said carriage means includes interconnecting driving means coupling said wheel means to said scale means, together with means for zero-setting said scale means in response to said control means, said scale means including means to measure the length of a straight line as it is drawn, whereby said scale means and said marking means can be viewed simultaneously.

12. A drafting machine as recited in claim 3 together with guide line means attached to said L-shaped square means, whereby said marking means can be used to draw uniform height lettering in response to said control means.

13. A drafting machine as recited in claim 3 together with support means, upper board means mounted thereon and having drawing surface means thereon, a second board spaced from and below said upper board means, said L-shaped square means mounted on said second board below said upper board means, said marking means including at least an inverted marking element mounted on an upper portion of said head means adjacent said upper board means, whereby a draftsman can draw rapidly with ease while keeping said drawing surface means clean and unsmudged.

14. A drafting machine as recited in claim 3 together with support means, upper board means mounted thereon and having drawing surface means thereon, a second board spaced from and below said upper board means, said L-shaped square means mounted on said second board below said upper board means, said marking means including an inverted marking element mounted on an upper portion of said head means adjacent said upper board means and a lower marking element mounted on a lower portion of said head means adjacent said second board, whereby two fine sketches can be drawn simultaneously with ease.

15. A drafting machine as recited in claim 3 together with angular positioning means to maintain said L-shaped square means in a predetermined angular position as it is swept over a drawing surface.

16. A drafting machine as recited in claim 3 together with spacer means, whereby uniformly spaced lines can be drawn with ease.

17. A drafting machine as recited in claim 3 together with template means and template tracer means, said swivel arm including pantograph means, said template means being a long bar having a row of grooved characters and a straight groove parallel with said row of characters, said tracer means including a tracer pin movable in said grooved characters, said tracer means including a tail pin movable in said straight groove, said pantograph means engaged to said tracer means, said tracer pin movable over said characters in response to said control means, whereby enlarged characters of selective line width can be drawn with ease.

18. A drafting machine as recited in claim 3 wherein said head means and said second link are pivotally connected together, and wherein said carriage means includes angular positioning means to maintain said head means in a predetermined angular relationship with said L-shaped square means as said head means is swept over a drawing surface.

19. A drafting machine as recited in claim 3 wherein said control means includes a control handle for gripping by a draftsman, and wherein said last named means is responsive to a predetermined movement of said control handle to preselect said width, to lowering movement of said control handle to initiate drawing action, and to raising movement of said control handle to terminate said drawing action.

20. A drafting machine as recited in claim 3 wherein said carriage means includes means to use said marking means to draw freehand and template guided characters in response to said control means, whereby fine complete sketches can be drawn rapidly.

21. A drafting machine as recited in claim 3 wherein said head means includes a vertical shaft means, said shaft means including a pin adjustably offset from the longitudinal axis of said shaft means, said chassis including socket means, said pin being engageable with said socket means, said shaft means including pivotal mounting to allow it to be moved laterally in a circle about said socket means, said marking means being rotated laterally in response to said control means, whereby a circle is drawn.

22. A drafting machine as recited in claim 3 together with template means attached to said L-shaped square means, said carriage means including means to use said marking means to draw characters of said template means in response to said control means, whereby said template means is restrained from moving out of alignment with said L-shaped square means.

23. A drafting machine as recited in claim 6 wherein said carriage means includes means to draw a plurality of lines parallel to each other and in parallel relationship with the longitudinal axis of the adjacent one of said legs while said L-shaped square means remains in a set position, whereby little motion and little effort is required to draw numerous lines.

24. A drafting machine as recited in claim 7 wherein said marking element is made of material that wears off said conical tip and forms a deposit on said drawing surface to form said lines and wherein said marking means includes a feeding means that intermittently and automatically feeds said marking element towards said drawing surface to compensate for said wear, whereby said marking means can be used continuously.

25. A drafting machine as recited in claim 8 wherein said carriage means includes means to draw a plurality of lines parallel to each other and in parallel relationship with the longitudinal axis of the adjacent one of said legs while said L-shaped square means remains in a set position, whereby little motion and little effort is required to draw numerous lines.

26. A drafting machine as recited in claim 10 wherein said carriage means includes means to use said marking means to draw freehand and template guided characters in response to said control means, whereby fine sketches can be drawn rapidly.

27. A drafting machine as recited in claim 11 together with means to automatically draw intermittent lines in response to said control means, and wherein said carriage means includes means to use said marking means to draw freehand and template guided characters in response to said control means, whereby fine accurately scaled sketches can be drawn rapidly.

28. A drafting machine as recited in claim 11 wherein said scale means includes means to project a light-beam to carry a scale image to a surface adjacent said marking means.

29. A drafting machine as recited in claim 13 wherein said drawing surface means includes a light sensitive surface comprising photographic reproduction means, and wherein said inverted marking element includes a source of light for emitting a light-beam, said light-beam being projected onto said drawing surface means to obtain said lines, whereby fine lines for technical drawings can be drawn rapidly without delay to service said inverted marking element.

30. A drafting machine as recited in claim 13 wherein said drawing surface means includes a light sensitive surface comprising photographic color reproduction means, and wherein said inverted marking element includes a source of light and selective color filter means, said source of light emitting a light-beam projecting through said color filter means onto said drawing surface means to obtain said lines, whereby different colored and different width lines for technical drawings can be drawn rapidly.

31. A drafting machine as recited in claim 13 wherein said carriage means includes a tracer means responsive to said control means, whereby an accurate sketch is easily drawn.

32. A drafting machine as recited in claim 13 wherein at least said inverted marking element is an ink dispensing marker, whereby blemish-free selective width ink lines can be drawn rapidly without delays for ink to dry.

33. A drafting machine as recited in claim 13 wherein said carriage means includes wheel means engaged with said L-shaped track means, said carriage means including motor means interconnected with said wheel means, whereby said carriage means can readily be moved along said L-shaped track means.

34. A drafting machine as recited in claim 13 wherein said carriage means includes means to use said marking means to draw freehand and template guided characters in response to said control means, whereby fine sketches can be drawn rapidly.

35. A drafting machine as recited in claim 27 wherein said carriage means includes transverse drawing means responsive to said control means to draw a short line at right angles to an intermediate portion of one of said legs while said L-shaped square means remains in a set position and wherein said carriage means includes means to draw a plurality of lines parallel to each other and in parallel relationship with the longitudinal axis of the adjacent one of said legs while said L-shaped square means remains in a set position, whereby little motion and little effort is required to scale and draw numerous lines.

36. A drafting machine comprising an L-shaped square means, said L-shaped square means including two legs, said L-shaped square means having an L-shaped track means, said L-shaped track means being formed by intersecting straight track portions, a carriage means mounted on said L-shaped track means, said carriage means being a single carriage, said carriage means including marking means, control means mounted on said carriage means, said carriage means including two slidably mounted guide bars mounted at right angles to each other, said marking means being selectively engageable with said guide bars, said marking means being guided by one of said guide bars and being movable laterally away from and at right angles to an adjacent one of said legs in response to said control means, whereby transverse lines can be drawn at right angles to an intermediate portion of said one leg.

37. A drafting machine as recited in claim 36 together with scale means on said guide bars, whereby said transverse lines can be measured as drawn.

38. A drafting machine as recited in claim 36 wherein said carriage means includes lock means to selectively lock said guide bars in an extended position, and wherein movement of said carriage means along one of said legs causes said marking means to draw lines remote from and parallel to said one of said legs in response to said control means.

39. A drafting machine as recited in claim 36 wherein said carriage means includes lock means to lock said carriage means to said L-shaped track means, whereby said carriage means remains stationary while a line is drawn at right angles to said adjacent one of said legs.

40. A drafting machine as recited in claim 36 wherein said carriage means includes a vertical shaft means, said shaft means includes a pin adjustably offset from the longitudinal axis of said shaft means, said one guide bar having a socket, said pin being engageable with said socket, said shaft means including pivotal mounting to allow it to be moved laterally in a circle about said socket, said marking means being rotated laterally in response to said control means, whereby a circle is drawn.

41. A drafting machine as recited in claim 36 wherein said marking means includes means to make lines of selective width.

42. A drafting machine as recited in claim 36, wherein said carriage means includes wheel means engageable with said L-shaped track means, said carriage means including motor means interconnected with said wheel means, whereby numerous straight parallel lines can be drawn easily while said L-shaped square means remains in a position.

43. A drafting machine comprising a drawing board, an L-shaped square means mounted on said board, said L-shaped square means including two legs, said L-shaped square means having an L-shaped track means, said L-shaped track means being formed by intersecting straight track portions, a carriage means mounted on said L-shaped track means, said carriage means being a single carriage, a marking means mounted on said carriage means, control means mounted on said carriage means, said marking means includes means to make lines of selective width, said carriage including a chassis, said marking means being mounted so as to be movable laterally in relationship with said chassis, template means connected to at least one of said legs, said L-shaped square means including knobs forming lower extremities so as to engage said board, thereby positioning the major portion of said L-shaped square means in spaced relationship with said board, said template means being slidable under said L-shaped square means, said marking means drawing characters in response to movements of said control means.

44. A drafting machine as recited in claim 43 wherein said template means includes a channel shaped holder, said template means includes an elongated template slidably mounted in said holder, and wherein said holder being clamped to and in slidable relationship to said one of said legs, whereby said template means is automatically maintained in alignment with said one of said legs and whereby said elongated template can be slid back and forth without smearing a drawing surface.

References Cited

UNITED STATES PATENTS

| | | | |
|---|---|---|---|
| 1,584,839 | 5/1926 | Cameron | 33—107 |
| 1,746,830 | 2/1930 | Harmon | 33—79 |
| 2,088,063 | 7/1937 | Kassebaum. | |

FOREIGN PATENTS 870,955  6/1961  Great Britain.

HARRY N. HAROIAN, *Primary Examiner.*

U.S. Cl. X.R.

33—79, 32